United States Patent
Kudo

(10) Patent No.: US 8,803,937 B2
(45) Date of Patent: Aug. 12, 2014

(54) OPTICAL SCANNING APPARATUS AND IMAGE FORMING APPARATUS

(71) Applicant: Canon Kabushiki Kaisha, Tokyo (JP)

(72) Inventor: Genichiro Kudo, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/680,620

(22) Filed: Nov. 19, 2012

(65) Prior Publication Data

US 2013/0127974 A1 May 23, 2013

(30) Foreign Application Priority Data

Nov. 22, 2011 (JP) ................................. 2011-255117

(51) Int. Cl.
- *B41J 2/385* (2006.01)
- *B41J 2/47* (2006.01)
- *B41J 27/00* (2006.01)

(52) U.S. Cl.
USPC ........... 347/244; 347/137; 347/243; 347/259; 347/261

(58) Field of Classification Search
USPC ......... 347/111, 129, 134, 137, 224, 225, 233, 347/241, 243, 244, 256, 258, 259, 260, 261
See application file for complete search history.

(56) References Cited

U.S. PATENT DOCUMENTS

| 7,623,280 B2 | 11/2009 | Hirakawa et al. | |
|---|---|---|---|
| 2008/0267663 A1* | 10/2008 | Ichii et al. | 399/177 |
| 2010/0328417 A1* | 12/2010 | Saisho et al. | 347/243 |
| 2011/0052263 A1 | 3/2011 | Tatsuno | |

FOREIGN PATENT DOCUMENTS

| JP | 64000910 A | 1/1989 |
|---|---|---|
| JP | 6018802 A | 1/1994 |
| JP | 2000028942 A | 1/2000 |
| JP | 2005049510 A | 2/2005 |
| JP | 2008268721 A | 11/2008 |
| JP | 2009003393 A | 1/2009 |
| JP | 2009031673 A | 2/2009 |
| JP | 2011053436 A | 3/2011 |

* cited by examiner

*Primary Examiner* — Alessandro Amari
*Assistant Examiner* — Kendrick Liu
(74) *Attorney, Agent, or Firm* — Rossi, Kimms & McDowell LLP

(57) ABSTRACT

An optical scanning apparatus, including: a light source; an incident optical system; and an imaging optical system, in which: the imaging optical system includes at least one plastic lens; in a sub-scanning section, principal rays of the beams intersect each other on an optical axis of the imaging optical system; the principal rays intersect each other at different positions between a case of entering a central region of the at least one plastic lens and a case of entering an end region of the at least one plastic lens; and the principal rays entering one of the central region and the end region of the at least one plastic lens intersect each other, and the principal rays entering another of the central region and the end region of the at least one plastic lens intersect each other.

16 Claims, 13 Drawing Sheets

FIELD CURVATURE IN MAIN SCANNING
DIRECTION (WAVE OPTICS IMAGE PLANE)

FOCUS SHIFT AMOUNT IN MAIN SCANNING DIRECTION
AFTER TEMPERATURE RISING OF 15 °C (mm)

PRINT POSITION SHIFT AMOUNT IN MAIN SCANNING DIRECTION
AFTER TEMPERATURE RISING OF 15 °C (mm)

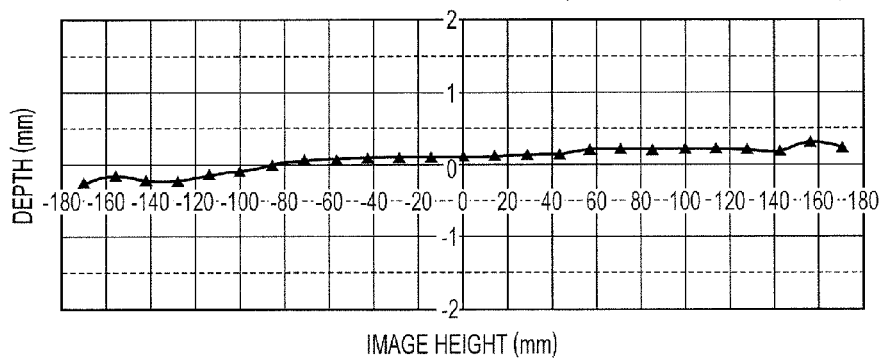
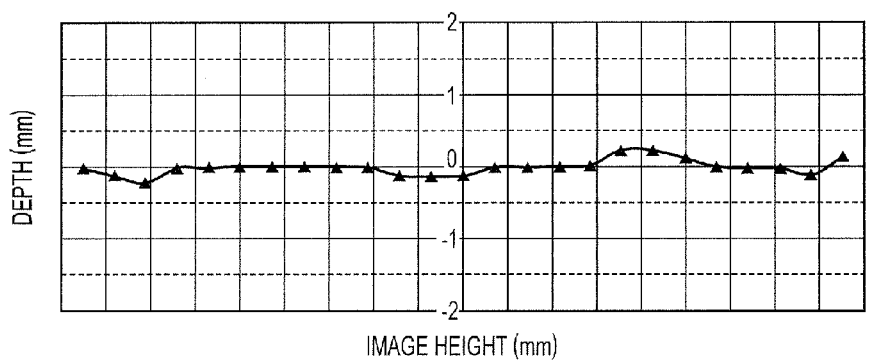
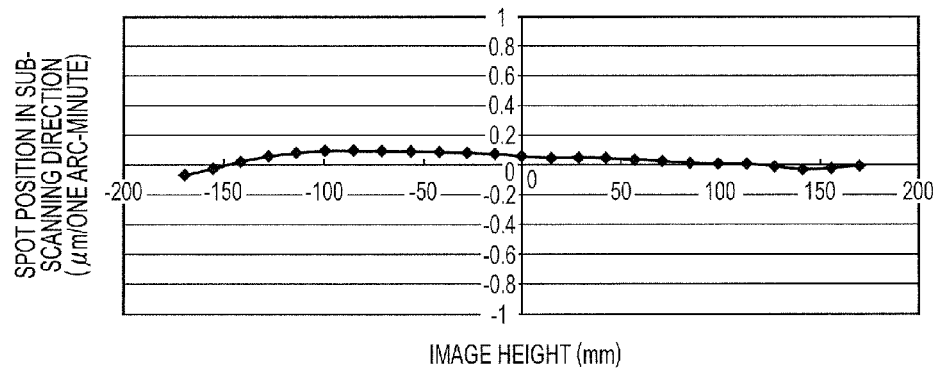

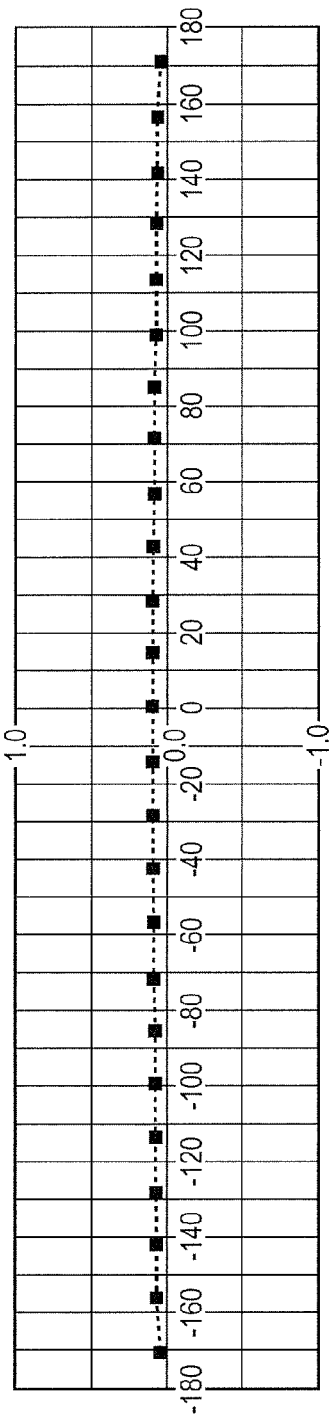

OPTICAL SCANNING APPARATUS AND IMAGE FORMING APPARATUS

BACKGROUND OF THE INVENTION

1. Field of the Invention

The present invention relates to an optical scanning apparatus and an image forming apparatus using the optical scanning apparatus, which are suitable for a laser beam printer, a digital copying machine, a multifunction printer, and the like using an electrophotographic process.

2. Description of the Related Art

Conventionally, an optical scanning apparatus used for an image forming apparatus such as a laser beam printer and a digital copying machine guides a beam emitted from a light source to a deflector by an incident optical system. Then, the beam deflected for scanning by the deflector is imaged by an imaging optical system on a photosensitive drum surface as a surface to be scanned into a spot shape, so that the beam optically scans the photosensitive drum surface.

As the optical scanning apparatus, there is known an optical scanning apparatus that further includes a multibeam light source having a plurality of light emitting points arranged at regular intervals at least in a sub-scanning direction so as to achieve both higher density of images and higher speed (see Japanese Patent Application Laid-Open No. 2008-268721). The apparatus disclosed in Japanese Patent Application Laid-Open No. 2008-268721 uses a scanning lens 11a on a polygon mirror side and a scanning lens 11b on the photosensitive drum side as the imaging optical system for imaging the beam deflected for scanning by the deflection surface in a main scanning direction on the surface to be scanned.

In addition, in a sub-scanning section, principal rays of a plurality of beams from the multibeam light source are set parallel to an optical axis between the scanning lens 11a and the scanning lens 11b. Further, the beams from the multibeam light source are condensed at a focus position on the photosensitive drum side of the scanning lens 11b. In other words, Ls=fs2 is satisfied, where Ls represents a distance in the optical axis direction between a position of the scanning lens 11b and a position where the principal rays of the plurality of beams intersect each other (principal ray intersection position), and fs2 represents a focal length of the scanning lens 11b. In this way, Japanese Patent Application Laid-Open No. 2008-268721 discloses a structure in which a separation amount between the scanning lens 11b and the principal ray intersection position is set large.

However, if a plastic lens is used for the imaging optical system in the optical scanning apparatus described in Japanese Patent Application Laid-Open No. 2008-268721, a new problem occurs as described below. Specifically, when the plurality of beams from the multibeam light source pass through the plastic lens, if the plurality of beams are separated from each other in the sub-scanning direction, spot diameters of the individual beams are different because of an influence of birefringence generated in molding of the plastic lens.

SUMMARY OF THE INVENTION

It is an object of the present invention to provide an optical scanning apparatus including a multibeam light source and an imaging optical system using a plastic lens, in which optical performance is secured so that high-definition image formation can be performed at high speed.

In order to achieve the above-mentioned object, according to a representative embodiment of the present invention, there is provided an optical scanning apparatus, including: a light source including a plurality of light emitting points arranged in at least a sub-scanning direction; an incident optical system configured to cause a beam from the light source to enter a deflection surface of a deflector; and an imaging optical system configured to condense the beam deflected for scanning by the deflection surface onto a surface to be scanned, in which: the imaging optical system includes at least one plastic lens; in a sub-scanning section, principal rays of the beams from the plurality of light emitting points intersect each other on an optical axis of the imaging optical system in a vicinity of the at least one plastic lens; the principal rays from the plurality of light emitting points intersect each other at different positions in a direction of the optical axis of the imaging optical system between a case of entering a central region of the at least one plastic lens and a case of entering an end region of the at least one plastic lens; and the principal rays entering one of the central region and the end region of the at least one plastic lens intersect each other at a position closer to the deflector than the at least one plastic lens, and the principal rays entering another of the central region and the end region of the at least one plastic lens intersect each other at a position closer to the surface to be scanned than the at least one plastic lens.

Further features of the present invention will become apparent from the following description of exemplary embodiments with reference to the attached drawings.

BRIEF DESCRIPTION OF THE DRAWINGS

FIG. 8A is a graph showing a wave optics field curvature in the main scanning direction in the second embodiment.

FIG. 8B is a graph showing a wave optics field curvature in the sub-scanning direction in the second embodiment.

FIG. 9 is a graph showing a spot position shift in the sub-scanning direction on a surface to be scanned when a deflection surface is inclined by one arc-minute in the second embodiment.

FIG. 10A is a graph showing focus position shifts in the main scanning direction after temperature rising of 15° C. in the second embodiment.

FIG. 10B is a graph showing print position shifts in the main scanning direction after temperature rising of 15° C. in the second embodiment.

DESCRIPTION OF THE EMBODIMENTS

First Embodiment

Image Forming Apparatus

Figure 1:
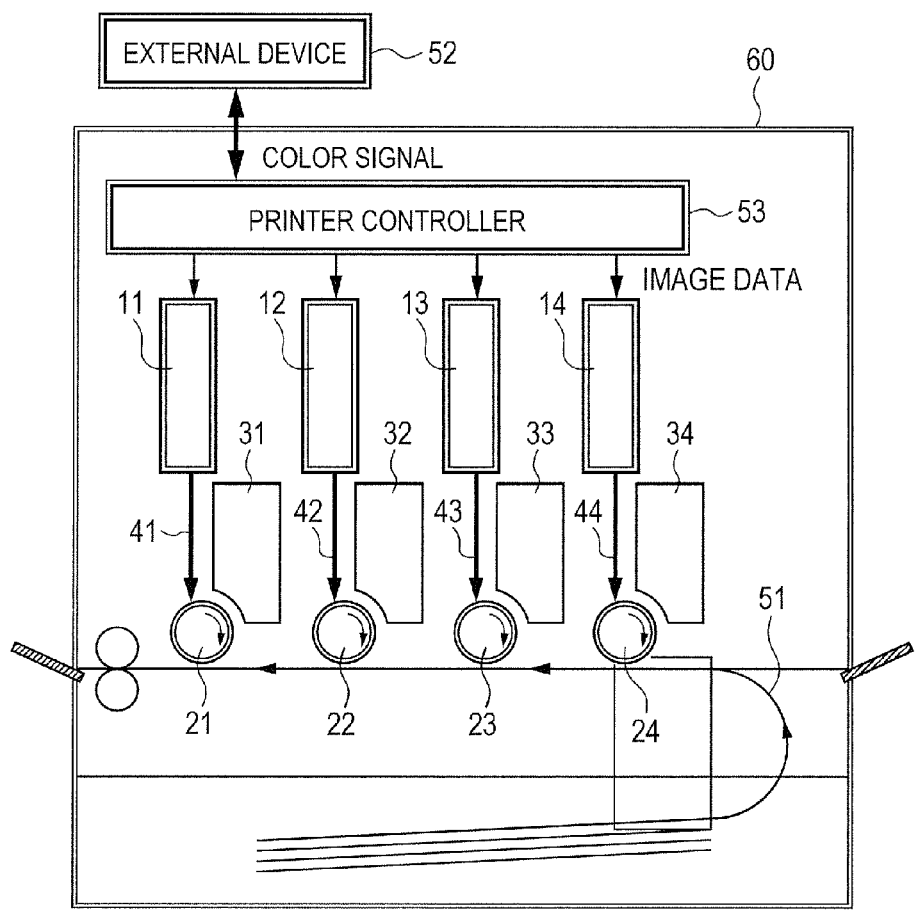
FIG. 1 is a schematic diagram of a color image forming apparatus according to an embodiment of the present invention.

FIG. 1 is a sub-scanning sectional view of a color image forming apparatus 60 including an optical scanning apparatus according to this embodiment. Optical scanning apparatus 11, 12, 13 and 14 commonly use a single deflector (polygon mirror). Further, light beams obliquely enter from the upper side and the lower side to different deflection surfaces of the deflector and are reflected by the deflection surfaces to be guided to corresponding image bearing members (photosensitive drums) 21, 22, 23 and 24, respectively.

Further, respective color signals of red (R), green (G) and blue (B) are input from an external device 52 such as a personal computer to the color image forming apparatus 60. The code data input from the external device 52 is converted into respective image signals (dot data) of cyan (C), magenta (M), yellow (Y) and black (K) by a printer controller 53 in the color image forming apparatus 60. The respective image signals are input to the optical scanning apparatus 11, 12, 13 and 14.

Then, light beams 41, 42, 43 and 44, which are modulated in accordance with the respective pieces of image data, are emitted from the optical scanning apparatus 11, 12, 13 and 14. Photosensitive surfaces of the photosensitive drums 21, 22, 23 and 24 are scanned with the light beams in a main scanning direction. In the color image forming apparatus 60 of this embodiment, the optical scanning apparatus emit beams through the single polygon mirror as described above, corresponding to the respective colors of cyan (C), magenta (M), yellow (Y) and black (K).

In this matter, the color image forming apparatus uses the light beams which are respectively based on image data to form electrostatic latent images of four colors on the surfaces of the photosensitive drums 21, 22, 23 and 24 respectively corresponding to the four colors. Then, the electrostatic latent images of respective colors are developed into toner images by developing units 31, 32, 33 and 34, which adhere toner as developer to the electrostatic latent images, and the toner images of the respective colors are then transferred in a manner of being superimposed by a transferring unit to a transfer material, which is conveyed by a conveyor belt 51. Then, the transfer material onto which the toner image has been transferred is heated and pressed by a fixing unit so that the toner image is fixed by heat, and then is delivered outside of the main body by a delivery roller (not shown). By the process described above, one full color image is formed.

The external device 52 may be a color image reading device including, for example, a CCD sensor. In this case, the color image reading device and the color image forming apparatus 60 constitute a color digital copying machine.

Optical Scanning Apparatus

Figure 2A:
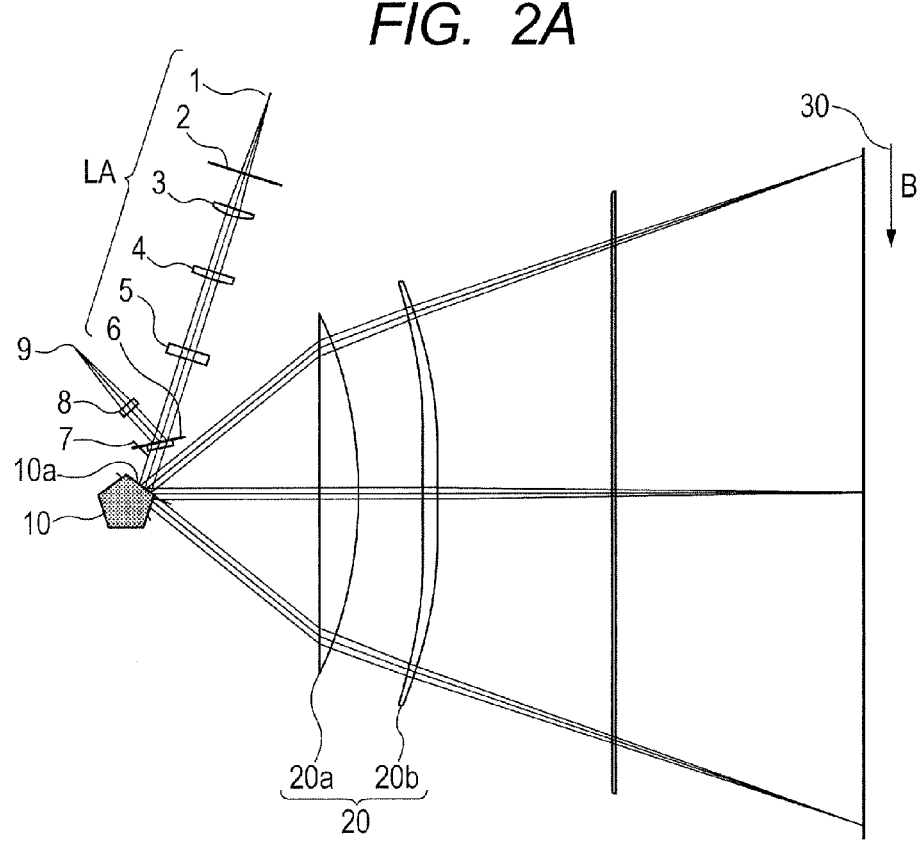
FIG. 2A is a main scanning sectional view of an optical scanning apparatus according to the embodiment of the present invention.
Figure 2B:
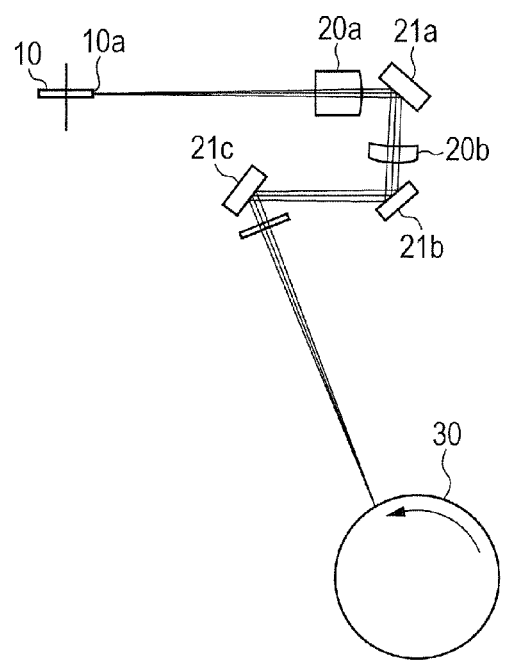
FIG. 2B is a sub-scanning sectional view of the optical scanning apparatus according to the embodiment of the present invention.
Figure 2C:
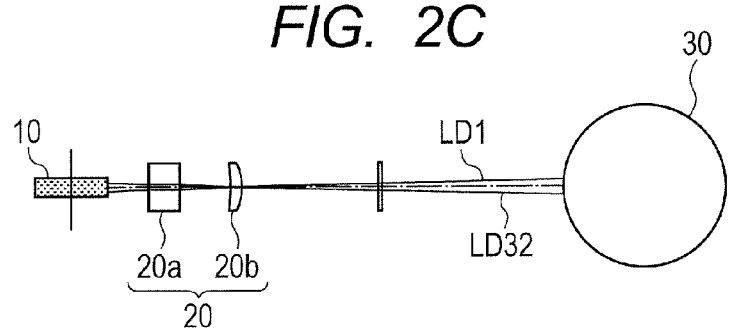
FIG. 2C is a diagram illustrating intersection of principal rays in the sub-scanning section of the optical scanning apparatus according to the embodiment of the present invention.

FIG. 2A is a main scanning sectional view of the optical scanning apparatus according to this embodiment, and FIGS. 2B and 2C are sub-scanning sectional views thereof. Note that, in the following description, the main scanning direction is a direction perpendicular to a rotation axis of the deflector and an optical axis of the imaging optical system (the direction in which the beam is deflected for scanning by the deflector). The sub-scanning direction is a direction parallel to a rotation axis of a rotating polygon mirror. In addition, the main scanning section means a plane including the main scanning direction and the optical axis of the imaging optical system. In addition, the sub-scanning section means a section that is perpendicular to the main scanning section.

Figure 3:
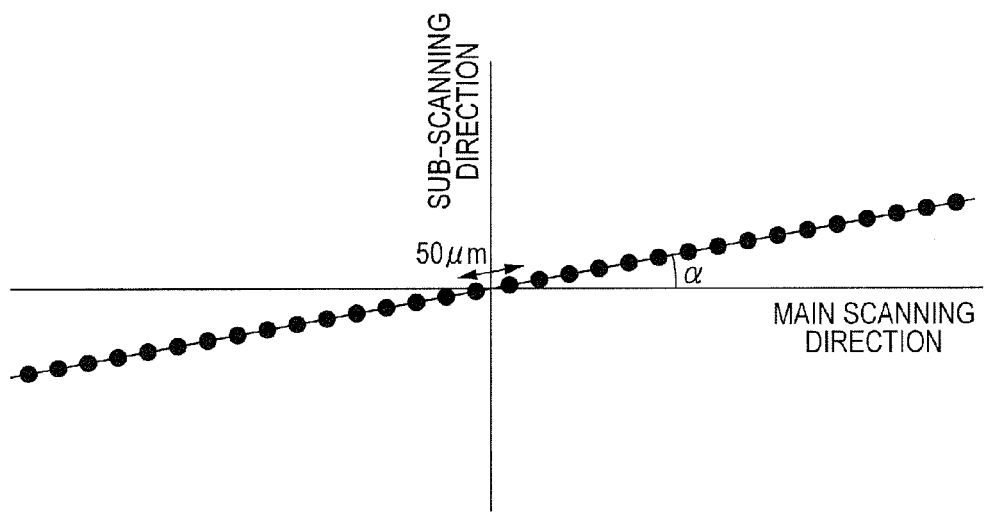
FIG. 3 is a schematic diagram of a light source including a plurality of light emitting points according to the embodiment of the present invention.

A light source (multibeam light source) 1 of this embodiment is constituted of a surface emitting laser having a plurality of light emitting points (semiconductor laser). As illustrated in FIG. 3, the light source 1 has 32 light emitting points, which are arranged linearly in a state of being inclined by an angle α (seven degrees) with respect to the main scanning section. Note that, an arrangement pitch of the light emitting points is 50 μm. Further, each of the light emitting points can be independently modulated, and a laser driver (not shown) can control intensity and timing of each light emission.

A first stop 2 restricts the width of the beam from the light source 1 in the sub-scanning direction and shapes the beam. The first stop 2 causes an exit pupil position in the sub-scanning direction to be close to an fθ lens 20b, and in the sub-scanning section, the principal rays of the plurality of beams intersect each other in a predetermined range in an optical axis direction including a position of the fθ lens 20b (details are described later). A collimator lens 3 is a condensing lens made of glass by a molding process. A surface of the collimator lens 3 on a deflector side has a rotationally symmetric non-arc (aspheric) shape, so as to reduce a spot diameter difference between the light emitting points of the light source 1, and to convert a diverging beam emitted from the light source 1 into a collimated beam.

The collimator lens 3 has an aspheric surface shape added with an aspheric surface, in which a positive (convex) power is weakened from the lens optical axis toward the periphery. Thus, condensing positions (focus positions) of the beams from the plurality of light emitting points on the surface to be scanned or the deflection surface become substantially the same. Thus, spot diameters of the plurality of beams on the surface to be scanned become substantially the same.

A spherical lens 4 is a convex lens made of glass and is a lens for adjusting the spot diameter on the surface to be scanned. A cylindrical lens 5 has power only in the sub-scanning section (sub-scanning direction). The cylindrical lens 5 images the beam, which has passed through the collimator lens 3 and the spherical lens 4, into a linear image on a deflection surface (reflection surface) 10a of a deflector 10 in the sub-scanning section.

A second stop 6 is disposed in a vicinity of the deflector 10 and restricts the width of the beam from the cylindrical lens 5 in the main scanning direction, so as to shape the beam. In addition, the second stop 6 can cause principal rays of beams from the light emitting points to be close to each other on the deflection surface, and hence it is possible to reduce a vertical line fluctuation generated in a structure including the multi-beam light source.

A light quantity detection sensor 9 is used for controlling each beam of the light source 1 to emit light at a desired quantity. Unlike an edge emitting laser, the surface emitting laser cannot include an auto power control (APC) sensor in the element, and thus has the light quantity detection sensor 9 for APC outside the light source 1 in this embodiment.

A prism 7 has a wedge shape in the main scanning section and is disposed so that the second stop 6 is on an incident surface of the prism 7. A sensor lens 8 is a lens for condensing the beam reflected by the incident surface of the prism 7 onto the light quantity detection sensor 9. Note that, the incident surface and an exit surface of the prism 7 have an angle of 5 degrees with respect to the optical axis in the main scanning section, so that reflection light from the exit surface does not enter the sensor 9.

Note that, the collimator lens 3 and the cylindrical lens 5 may be constituted of a single optical element. In addition, each of the first stop 2, the collimator lens 3, the spherical lens 4, the cylindrical lens 5 and the second stop 6 constitute an element of an incident optical system LA. In addition, the prism 7, the sensor lens 8 and the light quantity detection sensor 9 constitute an element of an APC optical system.

The deflector 10 is a polygon mirror (rotating polygon mirror) having five deflection surfaces, and is rotated clockwise at a constant speed by a motor (not shown) as driving means. An imaging optical system 20 is an fθ lens system having a condensing function and fθ characteristic, and includes first and second imaging lenses (fθ lenses) 20a and 20b.

The fθ lens 20a is a flat convex spherical lens made of glass. In addition, the fθ lens 20b is made of plastic and is an anamorphic lens having an aspheric shape in the main scanning section.

The imaging optical system 20 images the beam reflected and deflected by the deflector 10 on a photosensitive drum surface 30 as the surface to be scanned. Further, the imaging optical system 20 performs optical face tangle error correction by making a conjugate relationship between each of the deflection surfaces 10a of the deflector 10 and the photosensitive drum surface 30 in the sub-scanning section.

The exit surface of the fθ lens 20b according to this embodiment has a non-arc shape in the sub-scanning section, and a non-arc amount is varied in a longitudinal direction of the fθ lens 20b (main scanning direction). Thus, a wavefront aberration amount in the sub-scanning direction is varied in accordance with a position in the main scanning direction, so that a wave optics field curvature in the sub-scanning direction is reduced. In addition, by appropriately generating sub-scanning paraxial field curvature of the imaging optical system 20, a spot position shift on the surface to be scanned in the sub-scanning direction when an optical face tangle error occurs is reduced, so that a pitch unevenness is reduced.

In this embodiment, each of the plurality of beams optically modulated based on image information and emitted from the light source 1 is restricted in beam width in the sub-scanning direction by the first stop 2 and is converted into a collimated beam by the collimator lens 3 and the spherical lens 4. The beam entering the cylindrical lens 5 exits as it is in the main scanning section, and the beam width thereof in the main scanning direction is restricted by the second stop 6.

In addition, in the sub-scanning section, the beam is converged and passes through the second stop 6, so as to form a linear image, which is long in the main scanning direction, in the vicinity of the deflection surface 10a of the deflector 10. Then, each of the plurality of beams reflected and deflected by the deflection surface 10a of the deflector 10 enters the fθ lens 20a having positive (convex) power mainly in the main scanning direction and is reflected by a reflection mirror 21a. Further, each of the plurality of beams passes through the fθ lens 20b having positive (convex) power in the main scanning direction and is reflected by reflection mirrors 21b and 21c, so as to form a spot-like image on the photosensitive drum surface 30.

By rotating the deflector 10 in a clockwise direction, the beam scans the photosensitive drum surface 30 at constant speed in a direction of arrow B (main scanning direction). Thus, a plurality of scanning lines are formed simultaneously on the photosensitive drum surface 30 as a recording medium, so as to record an image. As illustrated in FIG. 2B, by using the flat surface mirrors 21a, 21b and 21c, an optical path of the imaging optical system can be folded to be compact, and hence the width of the image forming apparatus (in a lateral direction in FIG. 2A) can be reduced.

In addition, as illustrated in FIG. 2C, the exit pupil position in the sub-scanning direction is set so that 32 principal rays of the beams emitted from the respective light emitting points intersect each other in the vicinity of the fθ lens 20b. Note that, FIG. 2C illustrates only principal rays of beams emitted from most off-axis light emitting points LD1 and LD32 in the main scanning direction. In addition, in order to adjust a beam interval error that occurs due to fixing error or the like in an assembly process of the light source 1, there is adopted a structure in which the light source 1 can be rotated about an axis parallel to the optical axis of the incident optical system LA.

A structure of the optical scanning apparatus according to this embodiment is shown in Table 1. Here, "E-x" represents "$10^{-x}$". In addition, an R1 surface is a surface of the fθ lens 20a on the deflector 10 side, an R2 surface is a surface of the fθ lens 20a on the side of the surface 30 to be scanned, an R3 surface is a surface of the fθ lens 20b on the deflector 10 side, and an R4 surface is a surface of the fθ lens 20b on the side of the surface 30 to be scanned.

TABLE 1

| | |
|---|---|
| Working wavelength (m) | 6.80E−07 |
| Refractive index of imaging lens 20a ($\lambda$ = 680 nm) | 1.79364 |
| Refractive index of imaging lens 20b ($\lambda$ = 680 nm) | 1.52694 |
| Number of surfaces of deflector | 5 |
| Circumcircle radius of deflector (mm) | 34 |
| Rotation angle of deflector (±deg.) | 19.56 |
| Incident angle in main scanning direction (deg.) | 70 |

TABLE 1-continued

| | |
|---|---|
| Incident angle in sub-scanning direction (deg.) | 0 |
| Axial deflection point to incident surface of first imaging lens (mm) | 9.00E+01 |
| Focal length of imaging optical system (mm) | 2.50E+02 |
| Best spot diameter on surface to be scanned (main × sub μm) | 40 × 40 |

Rotation center coordinates of deflector

| | |
|---|---|
| X | −11.95 |
| Y | −6.91 |

| | R1 surface | | R2 surface | |
|---|---|---|---|---|
| | Scan start side (s) | Scan end side (e) | Scan start side (s) | Scan end side (e) |
| Main scan and sub-scan | d    2.00E+01 | | d    3.260E+01 | |
| | R    ∞ | | R    −2.26E+02 | |
| | r    ∞ | | r    −2.26E+02 | |

| | | R3 surface | | R4 surface | |
|---|---|---|---|---|---|
| | | Scan start side (s) | Scan end side (e) | Scan start side (s) | Scan end side (e) |
| Main scanning section | d | 7.50E+00 | | 2.18E+02 | |
| | R | 4.44E+03 | | −1.24E+03 | |
| | K | 4.01E+01 | K  4.01E+01 | K  −1.52E+01 | K  −1.52E+01 |
| | $B_4$ | −2.41E−07 | $B_4$  −2.41E−07 | $B_4$  −2.30E−07 | $B_4$  −2.30E−07 |
| | $B_6$ | 1.79E−11 | $B_6$  1.79E−11 | $B_6$  1.62E−11 | $B_6$  1.62E−11 |
| | $B_8$ | −7.70E−16 | $B_8$  −7.70E−16 | $B_8$  −6.60E−16 | $B_8$  −6.60E−16 |
| | $B_{10}$ | 2.31E−20 | $B_{10}$  2.31E−20 | $B_{10}$  2.11E−20 | $B_{10}$  2.11E−20 |
| Sub-scanning section | r | −7.95E+01 | | −3.33E+01 | |
| | $D_2$ | 2.11E−04 | $D_2$  4.98E−04 | $D_2$  8.59E−05 | $D_2$  1.89E−04 |
| | $D_4$ | −2.33E−08 | $D_4$  −5.72E−10 | $D_4$  −1.36E−08 | $D_4$  −3.91E−08 |
| | $D_6$ | 0.00E+00 | $D_6$  0.00E+00 | $D_6$  1.44E−12 | $D_6$  6.92E−12 |
| | $D_8$ | 0.00E+00 | $D_8$  0.00E+00 | $D_8$  −9.64E−17 | $D_8$  −6.74E−16 |
| | $D_{10}$ | 0.00E+00 | $D_{10}$  0.00E+00 | $D_{10}$  4.62E−22 | $D_{10}$  2.66E−20 |
| | $M_0$ | 0.00E+00 | | $M_0$  3.30E−06 | |
| | $M_1$ | 0.00E+00 | | $M_1$  −5.77E−09 | |
| | $M_2$ | 0.00E+00 | | $M_2$  −6.12E−10 | |
| | $M_3$ | 0.00E+00 | | $M_3$  7.28E−13 | |
| | $M_4$ | 0.00E+00 | | $M_4$  2.51E−14 | |

Incident optical system

| | r | d | N (680 nm) |
|---|---|---|---|
| Light source (light emitting point) | 0 | 43.15 | 1.0000 |
| Sub-scanning stop | | 17.9790 | 1.0000 |
| Collimator lens* | ∞ | 3.5900 | 1.5793 |
| | −46.2638 | 76.0000 | 1.0000 |
| Spherical lens | ∞ | 4.0000 | 1.5131 |
| | 171.9690 | 30.0000 | 1.0000 |
| Cylindrical lens | ∞ (−38.08) | 5.0000 | 1.5131 |
| | ∞ | 44.4300 | 1.0000 |
| Main scanning stop | | 25.0000 | |
| Wedge prism | ∞ | 2.3804 | 1.5131 |
| | ∞ | 25.0500 | 1.0000 |
| Deflection surface | ∞ | 0.0000 | 1.0000 |

Aspheric coefficient

| | |
|---|---|
| A | 0.00E+00 |
| B | 7.78E−07 |
| C | −4.79E−09 |
| D | 0.00E+00 |
| E | 0.00E+00 |
| F | 0.00E+00 |
| G | 0.00E+00 |

*aspheric surface, values in parentheses are in sub-scanning direction

In this embodiment, the shape of the fθ lens 20b in the main scanning section can be expressed by the following functions, in which the intersection with the optical axis is regarded as an origin. Here, the optical axis is regarded as an X axis, an axis perpendicular to the optical axis in the main scanning section is regarded as a Y axis, and an axis perpendicular to the optical axis in the sub-scanning section is regarded as a Z axis.

Scan Start Side $$x = \frac{\frac{y^2}{R}}{1+\sqrt{1-(1+K)(y/R)^2}} + B_{4s}y^4 + B_{6s}y^6 + B_{8s}y^8 + B_{10s}y^{10} \quad (a)$$

Scan End Side $$x = \frac{\frac{y^2}{R}}{1+\sqrt{1-(1+K)(y/R)^2}} + B_{4e}y^4 + B_{6e}y^6 + B_{8e}y^8 + B_{10e}y^{10} \quad (b)$$

In the functions, R represents a curvature radius, K, $B_4$, $B_6$, $B_8$ and $B_{10}$ are aspheric coefficients, in which a suffix s means the scan start side while a suffix e means the scan end side. In this embodiment, the shape of the fθ lens 20b in the main scanning section is adapted to be symmetric with respect to the optical axis. In other words, when the fθ lens 20b is divided into the scan start side and the scan end side with respect to the optical axis, the aspheric coefficients on both sides are identical to each other.

In addition, as to the fθ lens 20b, the incident surface has an arc shape in the sub-scanning section, and the exit surface has a non-arc shape having a fourth order term of Z in the sub-scanning section. The non-arc amount of the exit surface of the fθ lens 20b varies in the longitudinal direction (main scanning direction). Further, a curvature of the incident surface of the fθ lens 20b in the sub-scanning cross section that includes the optical axis and is perpendicular to the main scanning section is expressed by 1/r, and the fourth order aspheric coefficient of the exit surface is expressed by a function of y. Then, the shapes of the incident surface and the exit surface are respectively continuous in an effective scanning region of the fθ lens 20b.

The optical axis is regarded as the X axis, the axis perpendicular to the optical axis in the main scanning section is regarded as the Y axis, and the axis perpendicular to the optical axis in the sub-scanning section is regarded as the Z axis. Then, the shape of the fθ lens 20b in the sub-scanning section can be expressed by the following continuous functions.

Scan Start Side $$S = \frac{\frac{z^2}{r'}}{1+\sqrt{1-(z/r')^2}} + \sum_{i=0}^{10} M_i y^i Z^4$$

$$r' = r(1 + D_{2s}y^2 + D_{4s}y^4 + D_{6s}y^6 + D_{8s}y^8 + D_{10s}y^{10})$$

Scan End Side $$S = \frac{\frac{z^2}{r'}}{1+\sqrt{1-(z/r')^2}} + \sum_{i=0}^{10} M_i y^i Z^4$$

$$r' = r(1 + D_{2e}y^2 + D_{4e}y^4 + D_{6e}y^6 + D_{8e}y^8 + D_{10e}y^{10})$$

In the functions, r' represents a curvature radius in the sub-scanning direction, $D_j$ represents a curvature variation coefficient, and $M_i$ represents a sagittal line curvature coefficient. In addition, the curvature radius in the sub-scanning section indicates a curvature radius in a section perpendicular to a shape (meridional line) in the main scanning section.

In this embodiment, the following design viewpoints are considered.

1. Design for Improving Environmental Resistance Performance

Figure 4A:
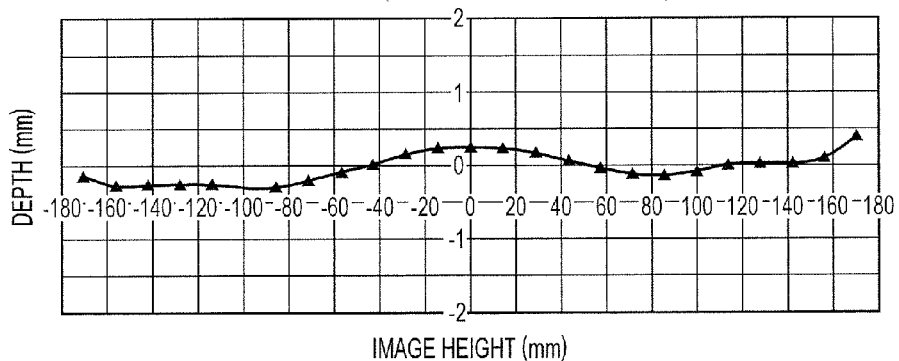
FIG. 4A is a graph showing a focus position in a main scanning direction in a first embodiment of the present invention.
Figure 4B:
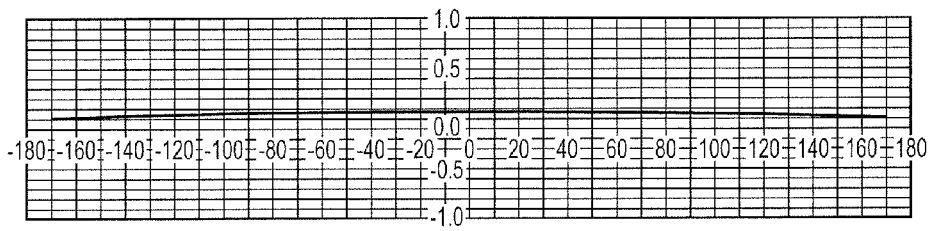
FIG. 4B is a graph showing focus position shifts in the main scanning direction after temperature rising of 15° C. in the first embodiment.
Figure 4C:
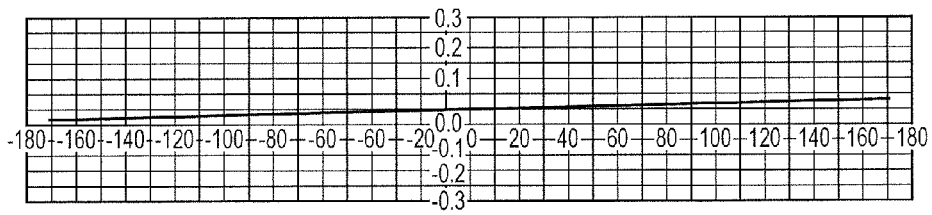
FIG. 4C is a graph showing print position shifts after temperature rising of 15° C. in the first embodiment.

In this embodiment, the fθ lens 20a having power mainly in the main scanning direction is made of glass, so as to reduce print position shift and focus position shift in the main scanning direction when the temperature changes. FIG. 4A shows a focus position in the main scanning direction in this embodiment. FIGS. 4B and 4C respectively show the focus position shift and the print position shift in the main scanning direction after temperature rising of 15° C. The focus position shift is 0.1 mm or smaller, and the print position shift is 32 µm or smaller in the main scanning direction after temperature rising of 15° C. This is because the lens having power mainly in the main scanning direction is made of glass.

Note that, the glass used in this embodiment has a refractive index variation (a sum of dependence of the refractive index on temperature and dependence of the refractive index on wavelength) of −0.00012 after temperature rising of 15° C., which is approximately 1/17 of a refractive index variation (−0.00202) when plastic material is used.

2. Design for Reducing Sub-Scanning Density Unevenness

In this embodiment, the plastic lens (fθ lens 20b) has two surfaces in which the sagittal line curvature (sub-scanning curvature) is continuously changed in the main scanning direction, and the focus position in the sub-scanning direction and the sub-scanning pitch interval of the plurality of beams are set constant. In addition, the curvature radius in the sub-scanning direction is changed asymmetrically between the scan start side and the scan end side, so as to correct asymmetry of the focus and the pitch interval due to asymmetry (sag) of a deflection point on the deflection surface. In this embodiment, the pitch interval error is set to be 5 µm or smaller, more preferably 1 µm or smaller, and hence occurrence of the density unevenness on a formed image is suppressed.

3. Design for Reducing Deterioration in Optical Performance of Multibeam

In order to solve the following problems, this embodiment provides a structure in which the sub-scanning stop (first stop 2) is disposed at a position different from the main scanning stop (second stop 6), so that the principal ray intersection position of the plurality of beams in the sub-scanning section (sub-scanning exit pupil position) is set to be close to the plastic lens.

(1) Variation of the spot diameter among the beams due to birefringence of the plastic lens (2) Sub-scanning pitch interval error when a beam passing position is shifted in the sub-scanning direction (3) Sub-scanning pitch interval error due to position shifts of the photosensitive drum and the imaging optical system in the optical axis direction If the beams intersect each other in the sub-scanning direction at a position largely apart from the plastic lens in the optical axis direction, as the above-mentioned problem (1), the individual beams have different spot diameters in the sub-scanning direction, so that periodical density unevenness occurs in the image. This is because the plastic lens has a larger birefringence amount than the glass lens.

In addition, when the beam passes through a position in the sub-scanning direction different from a designed position due to an optical face tangle error or the like, a beam that passes through a position apart most in the sub-scanning direction is affected largely by the optical face tangle error, so that a large pitch interval error occurs, which remains as the problem (2). Further, if the sub-scanning intersection position is significantly close to the surface to be scanned, a pitch interval variation that occurs when a distance between the imaging optical system and the surface to be scanned changes becomes large, which remains as the problem (3).

4. Design for Reducing Pitch Unevenness by Optical Face Tangle Error

Figure 5A:
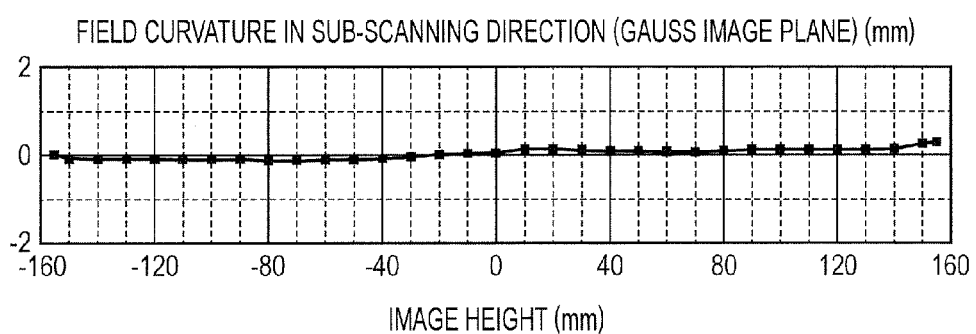
FIG. 5A is a graph showing optical performance in a comparative example.

The polygon mirror as the deflector has a so-called optical face tangle error that is a shift error of an angle of the deflection surface in the sub-scanning direction from a desired value due to a machining error of the deflection surface or an assembly error. As shown in FIG. 5A, an optical scanning apparatus according to a comparative example is designed so that the imaging position in the sub-scanning direction (paraxial image plane=gauss image plane) is substantially the same as the surface to be scanned. In other words, an imaging relationship of the imaging optical system in the sub-scanning direction is set so that a focus line imaged as a line in the vicinity of the deflection surface and the surface to be scanned become conjugate with each other.

Figure 5B:
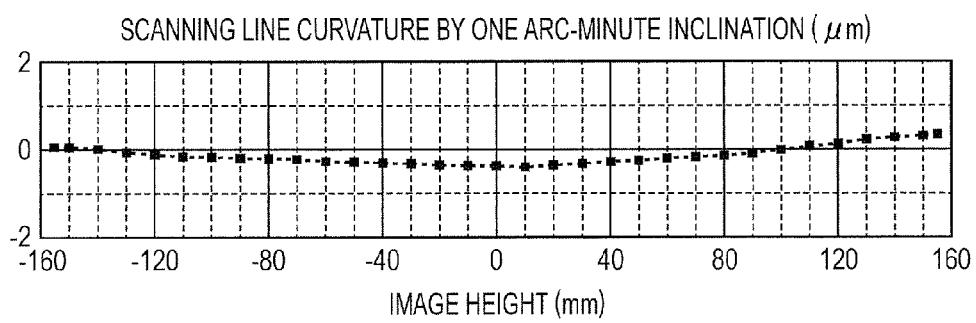
FIG. 5B is a graph showing optical performance in the comparative example.
Figure 5C:
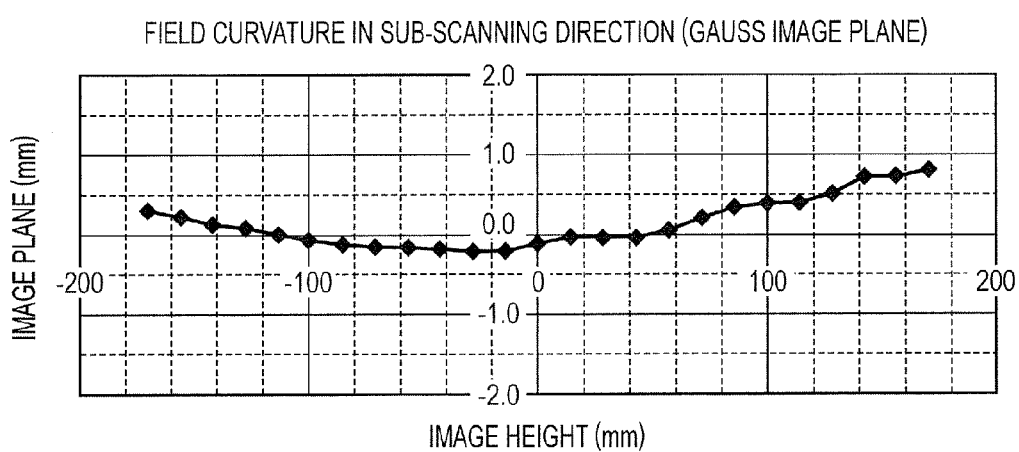
FIG. 5C is a graph showing optical performance in the first embodiment.
Figure 5D:
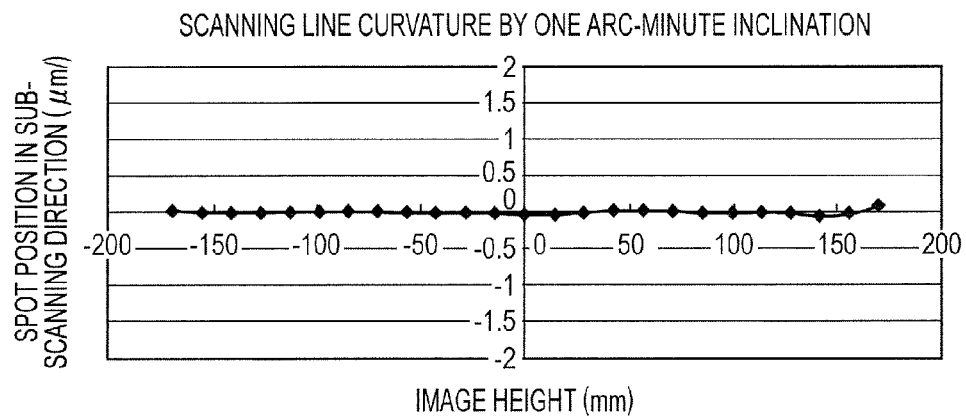
FIG. 5D is a graph showing optical performance in the first embodiment.
Figure 5E:
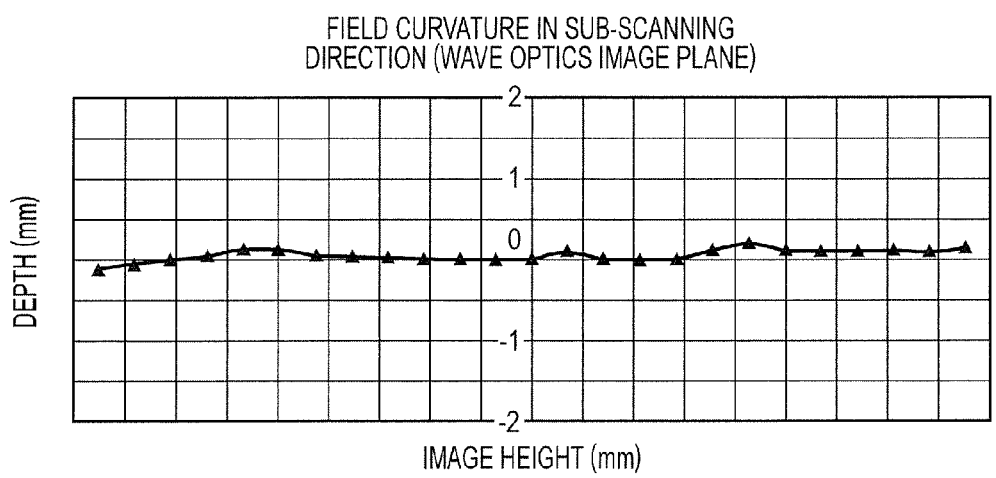
FIG. 5E is a graph showing optical performance in the first embodiment.

In this structure, when an optical face tangle error occurs, a beam reaching position on the surface to be scanned in the sub-scanning direction is shifted because of a sag (projection and depression) of the deflection surface, and hence pitch unevenness due to the optical face tangle error occurs as shown in FIG. 5B. However, in this embodiment shown in FIG. 5C, a curvature radius of the fθ lens 20b in the sub-scanning direction is set to an optimal value, so that the sub-scanning paraxial image plane is curved. Therefore, even if a optical face tangle error occurs by one arc-minute as shown in FIG. 5D, a spot barycenter position in the sub-scanning direction is not shifted. In addition, the fourth order aspheric surface is introduced in the fθ lens 20b, so as to reduce the wavefront aberration in the sub-scanning direction. Thus, as shown in FIG. 5E, a wave optics image plane position is identical to the surface to be scanned while the paraxial image plane is curved.

Here, the paraxial image plane means a image plane position determined in a geometrical and optical manner from a shape of the lens near the optical axis, and the wave optics image plane position means an image plane position where the wavefront aberration becomes smallest.

As shown in Table 1, the incident surface of the fθ lens 20a is constituted of a flat surface (r=∞). In addition, the exit surface of the fθ lens 20a is formed of a spherical surface. The incident surface of the fθ lens 20b has a non-arc shape in the meridional line direction, and a curvature in the sagittal line direction varies in the meridional line direction in which a curvature variation changes asymmetrically between the scan start side and the scan end side to form a sagittal line curvature variation asymmetric surface. Similarly to the incident surface, the exit surface of the fθ lens 20b has the meridional line non-arc shape and the sagittal line curvature variation asymmetric surface, and has a non-arc shape in the sagittal line direction. In addition, an aspheric amount in the sagittal line direction is changed in the meridional line direction, so that wave optics field curvature in the sub-scanning direction is corrected.

Intersection of Principal Rays in Sub-Scanning Section

Figure 6A:
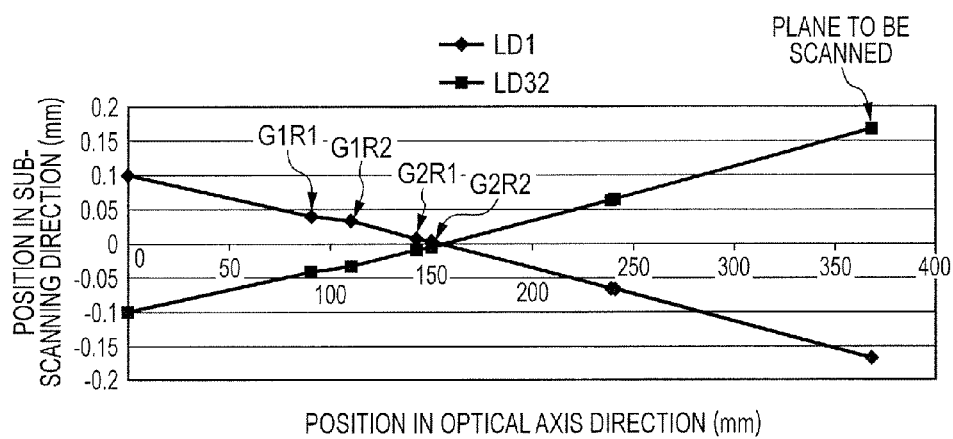
FIG. 6A is a graph showing the principal rays entering a central region in the first embodiment.
Figure 6B:
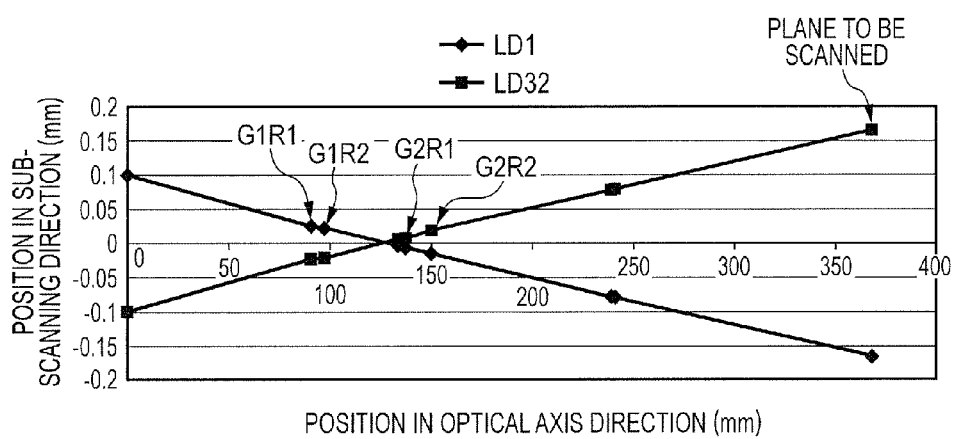
FIG. 6B is a graph showing the principal rays entering an end region in the first embodiment.

FIG. 6A shows principal ray passing positions in the sub-scanning section of the beams from the endmost light emitting points LD1 and LD32 among the 32 light emitting points on the optical axis of the imaging optical system 20 (in a vicinity of zero image height). In addition, FIG. 6B shows principal ray passing positions in the sub-scanning section of the beams from the light emitting points LD1 and LD32 off the axis of the imaging optical system 20 (image height Y=170 mm). Here, in FIGS. 6A and 6B, a horizontal axis represents a position in the optical axis direction while a vertical axis represents a position in the sub-scanning direction. Positions of the light emitting points LD1 and LD32 in the sub-scanning direction in FIGS. 6A and 6B correspond to positions of the light emitting points LD1 and LD32 in the sub-scanning direction in FIG. 2C. Note that, a position of 0 in the sub-scanning direction in FIGS. 6A and 6B represents the optical axis of the imaging optical system.

As shown in FIG. 6A, on the optical axis of the imaging optical system 20 (in a vicinity of an image height Y=0 mm), the principal rays of the beams from the plurality of light emitting points (LD1 to LD32) are substantially identical to each other on the side closer to the surface to be scanned than the R2 surface of the fθ lens 20b made of plastic in the sub-scanning section after passing through the fθ lens 20a made of glass. In addition, as shown in FIG. 6B, off the axis of the imaging optical system 20 (image height Y=170 mm), the principal rays of the plurality of beams (LD1 to LD32) are substantially identical to each other on the deflection surface side of the R1 surface of the fθ lens 20b made of plastic in the sub-scanning section after passing through the fθ lens 20a made of glass.

In other words, in the sub-scanning section, the principal rays of the plurality of beams intersect each other in a vicinity of the fθ lens 20b (in a predetermined range in the optical axis direction including a position of the fθ lens 20b). In this case, the intersection position of the principal rays is different in the optical axis direction between a case of entering the central region (on-axis) of the fθ lens 20b and a case of entering the end region (off-axis). Each of the intersection positions is positioned at the front of the fθ lens 20b (deflector side) or at the rear of the fθ lens 20b (side of the surface to be scanned). Thus, an absolute value of an optical axis separation amount in the sub-scanning direction can be reduced in the entire region in the main scanning direction of the fθ lens 20b made of plastic. In this embodiment, on the axis (in a vicinity of image height Y=0 mm), the principal rays intersect each other on the side closer to the surface to be scanned than the fθ lens 20b. Off the axis (image height Y=170 mm), the principal rays intersect each other on the deflector side of the fθ lens 20b.

In this embodiment, the following setting is performed. When each of the principal rays of the beams from the light emitting points LD1 and LD32 enters on the axis of the imaging optical system 20 (in a vicinity of image height Y=0 mm), the principal ray passes through the fθ lens 20a at such a position that the sub-scanning separation amount becomes 41 μm on the R1 surface and 34 μm on the R2 surface. In addition, the principal ray passes through the fθ lens 20b at such a position that the sub-scanning separation amount becomes 8.5 μm on the R1 surface and 5 μm on the R2 surface.

Further, the following setting is performed. When each of the principal rays of the beams from the light emitting points LD1 and LD32 enters off the axis of the imaging optical system 20 (image height Y=170 mm), the principal ray passes through the fθ lens 20a at such a position that the sub-scanning separation amount becomes 26 μm on the R1 surface and 23 μm on the R2 surface. In addition, the principal ray passes through the fθ lens 20b at such a position that the sub-scanning separation amount becomes 6.4 μm on the R1 surface and 8.2 μm on the R2 surface.

Therefore, the beam separation amount conditional expression |Z1|>2×|Z2| is satisfied, where Z1 represents the sub-scanning separation amount of the principal rays of the beams from the light emitting points LD1 and LD32 on the exit surface of the fθ lens 20a (G1R2 surface), and Z2 represents the sub-scanning separation amount of the principal rays of the beams from the light emitting points LD1 and LD32 on the exit surface of the fθ lens 20b (G2R2 surface). In addition, in this embodiment, the position where the plurality of principal rays intersect each other in the sub-scanning section is on the axis (in a vicinity of image height Y=0 mm) at a distance of Ls=6.34 mm from the G2R2 surface in the optical axis direction as shown in FIG. 6A.

In addition, off the axis (image height Y=170 mm), the plurality of principal rays intersect each other at a distance of Ls=−23.37 mm from the G2R2 surface in the optical axis direction. The G2 lens is constituted to have a focal length of fs2=102.83 mm, so as to satisfy the conditional expression |Ls|<0.3×fs2 in both the on-axis case and the off-axis case. Here, Ls represents a distance in the optical axis direction between the position of the exit surface of the fθ lens 20b and the position where the principal rays intersect each other in the sub-scanning section, and fs2 represents a focal length of the fθ lens 20b.

If the plurality of beams are apart in the sub-scanning direction on the fθ lens 20b made of plastic, the individual beams have different spot diameters due to an influence of birefringence generated in a molding process thereof. However, in this embodiment, because the apparatus is designed so as to satisfy the above-mentioned conditional expression |Z1|>2×|Z2|, the variation of the spot diameter among beams is reduced.

In addition, as shown in FIGS. 6A and 6B, by setting the distance L2=211.36 mm between the intersection position of the principal rays in the sub-scanning section and the surface to be scanned, and by setting the number of light emitting points (the number of beams) N=32, the position of the sub-scanning stop (first stop 2) is optimized so that the conditional expression L2≥2×(N−1) is satisfied. This is the conditional expression for controlling the pitch interval shift to be ¼ pixel or smaller even if, for example, the surface to be scanned is shifted by ±1 mm. If this conditional expression is not satisfied, the pitch interval error increases due to a position error of the surface to be scanned caused by the assembly error, so that it becomes difficult to achieve higher definition because of periodic unevenness generated in the image.

Therefore, by satisfying this conditional expression, it is possible to keep the position at which the plurality of beams intersect each other (sub-scanning exit pupil position) away from the surface to be scanned, so as to reduce a sub-scanning pitch interval error of the plurality of beams that may occur when the distance between the surface to be scanned and the fθ lens 20b is changed.

In addition, in this embodiment, main scanning direction power ΦG of a G1 lens is set to 0.00352, and main scanning direction power Φall of the entire fθ optical system is set to 0.004, so as to satisfy ΦG/Φall=0.88. This is for securing focus position stability in the main scanning direction and print position stability in the main scanning direction with respect to temperature variation by satisfying the conditional expression 0.6<ΦG/Φall<1. If this conditional expression is not satisfied, the focus position shift and the print position shift in the main scanning direction are increased, so that color misregistration and image deterioration when temperature rises are increased, which is not preferred.

In addition, by forming a non-arc shaped surface on the fθ lens 20b in a vicinity of the fθ lens 20b where the principal rays of the plurality of beams intersect each other, it is possible to reduce performance deterioration that may occur when each of the plurality of light beams is shifted in the sub-scanning direction on the fθ lens 20b forming the non-arc shaped surface. In addition, by using a sub-scanning non-arc shaped surface for the fθ lens 20b having a smallest beam width in the main scanning direction, it is possible to reduce a sub-scanning curvature variation in the beam, and hence spot shape deterioration on the surface to be scanned is reduced. The non-arc shape in the sub-scanning direction in this embodiment is constituted of only the fourth order of Z, but it is possible to use a non-arc shape of a sixth or higher order.

As described above, in this embodiment, a lens made of glass is used as the fθ lens 20a, so that environmental stability is improved and that principal rays in the sub-scanning direction intersect each other in a vicinity of the fθ lens 20b made of plastic. Thus, it is possible to provide the optical scanning apparatus and the image forming apparatus using the same, which can perform high-definition and high-speed image formation. Note that, the imaging optical system is constituted of two fθ lenses in this embodiment, but without limiting to this structure, it is possible to constitute the imaging optical system of three or more fθ lenses so that the same effect as in the above-mentioned embodiment can be obtained.

Here, the entire structure and effects of this embodiment are summarized as follows.

(1) The fθ lens 20a having largest power in the main scanning direction in the imaging optical system is made of glass.

(2) In the imaging optical system, curvatures of at least two surfaces are varied in the main scanning direction in the sub-scanning section.

(3) The first stop 2 of the incident optical system is set so that the principal rays of the plurality of beams from the multibeam light source intersect each other in a vicinity of the plastic lens (fθ lens 20b) in the sub-scanning section.

In this way, by means of the item (1), imaging performance deterioration in the main scanning direction is reduced. By means of the item (2), the interval of the plurality of beams in the sub-scanning direction is kept constant. By means of the item (3), a variation of the spot diameter in the sub-scanning direction is reduced. Thus, environmental performance, higher speed and higher definition can be achieved.

Second Embodiment

This embodiment is different from the first embodiment in a structure of the imaging optical system 20. Other structures and optical actions are the same as those of the first embodiment, so that the same effect can be obtained. Table 2 shows design parameters of this embodiment.

Figure 7A:
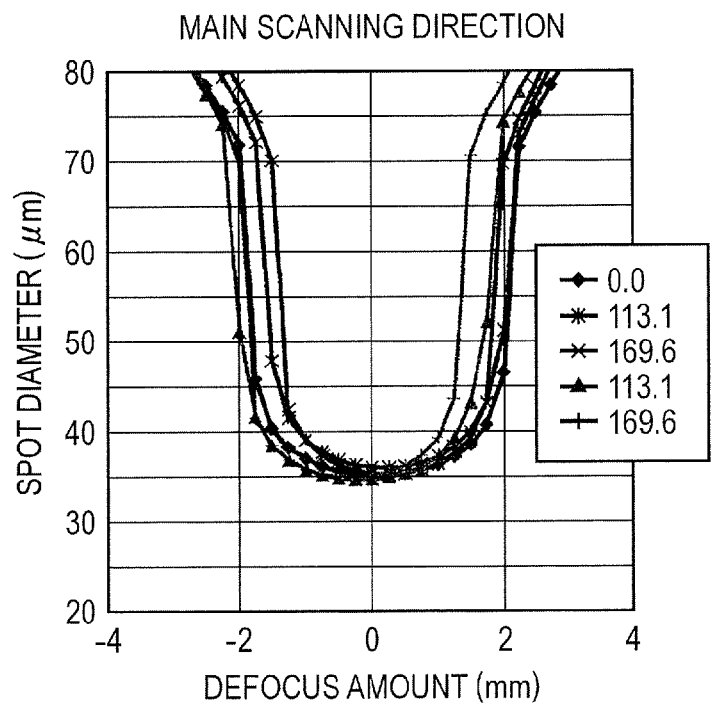
FIG. 7A is a graph showing a spot diameter in the main scanning direction in a second embodiment of the present invention.
Figure 7B:
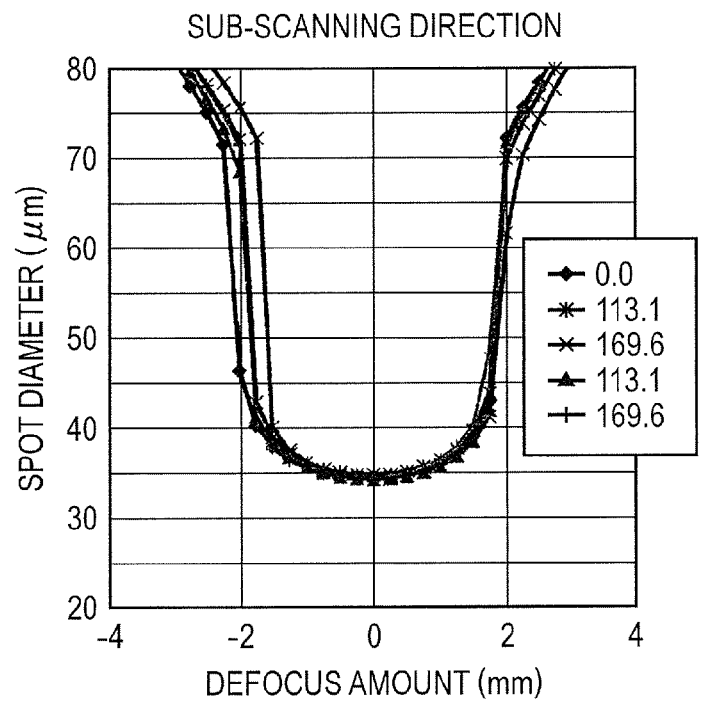
FIG. 7B is a graph showing a spot diameter in a sub-scanning direction in the second embodiment.

The imaging optical system 20 of this embodiment reduces wavefront aberration so as to support a smaller spot than in the first embodiment. Therefore, higher definition than in the first embodiment is achieved. FIGS. 7A and 7B show spot diameters of this embodiment. FIG. 7A shows spot diameters in the main scanning direction, and FIG. 7B shows spot diameters in the sub-scanning direction. In each graph, the horizontal axis represents a defocus amount in the optical axis direction on the surface to be scanned. The vertical axis represents a spot diameter, which indicates a diameter of $1/e^2$ of beam intensity of a spot imaged on the surface to be scanned.

As optical performance in this embodiment, FIG. 8A shows the focus position in the main scanning direction, and FIG. 8B shows the focus position in the sub-scanning direction. The field curvatures shown in FIGS. 8A and 8B indicate a center value of the defocus amount at which the spot diameter becomes 50 μm. In this embodiment, the spot diameter is set to be as fine as 35 μm compared with the first embodiment. Therefore, in order to secure uniformity of the spot diameter, the lens shape and the lens layout are optimized so that the wavefront aberration is appropriately corrected.

FIG. 9 shows the spot position shift on the surface to be scanned in the sub-scanning direction when the deflection surface is inclined by one arc-minute. In this embodiment too, similarly to the first embodiment, the sagittal line curvature of the imaging optical system 20 is varied continuously in the longitudinal direction so that the conjugate relationship of the imaging optical system 20 in the sub-scanning direction is achieved between the deflection surface and the surface to be scanned in the entire region in the main scanning direction. Therefore, a spot barycenter position shift can be reduced to be 0.2 μm or smaller even if the deflection surface is inclined by one arc-minute.

FIGS. 10A and 10B show performances in the main scanning direction after temperature rising of 15° C. FIG. 10A shows the focus position shift in the main scanning direction, and FIG. 10B shows the print position shift in the main scanning direction. In FIG. 10A, the focus position shift is controlled to be 0.1 mm or smaller, and similarly to the first embodiment, it is possible to provide an optical scanning apparatus having high environment stability. In addition, in FIG. 10B, the print position shift in the main scanning direction is controlled to be 40 μm or smaller. Thus, higher definition similar to the first embodiment can be achieved.

Figure 11A:
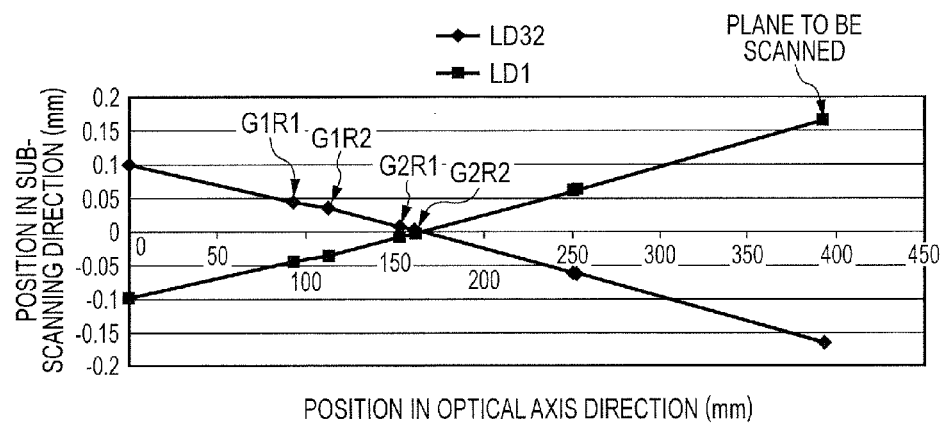
FIG. 11A is a graph showing the principal rays entering the central region in the second embodiment.
Figure 11B:
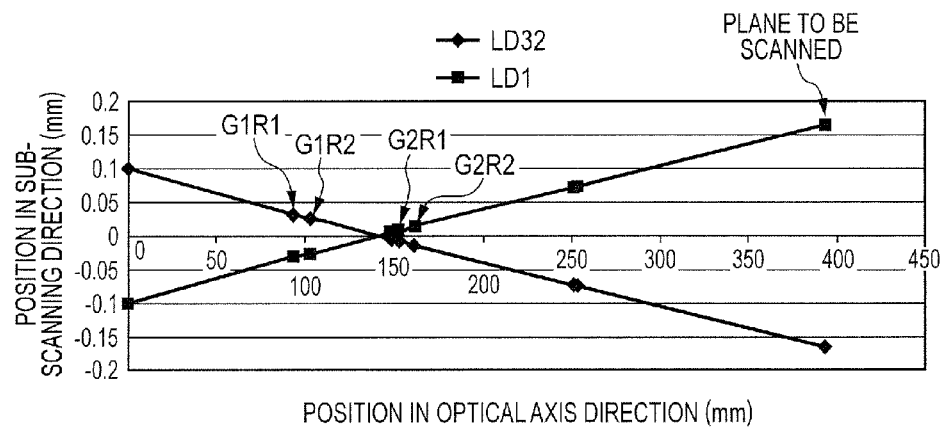
FIG. 11B is a graph showing the principal rays entering the end region in the second embodiment.

FIG. 11A shows principal ray passing positions in the sub-scanning section of the beams from the light emitting points LD1 and LD32 on the axis of the imaging optical system 20 (in a vicinity of the zero image height). In addition, FIG. 11B shows principal ray passing positions in the sub-scanning section of the beams from the light emitting points LD1 and LD32 off the axis of the imaging optical system 20 (at an image height Y=170 mm). Here, in each of FIGS. 11A and 11B, the horizontal axis represents a position in the optical axis direction, and the vertical axis represents a position in the sub-scanning direction. The positions of the light emitting points LD1 and LD32 in the sub-scanning direction in FIGS. 11A and 11B correspond to the positions of the light emitting points LD1 and LD32 in the sub-scanning direction in FIG. 2C. Note that, the sub-scanning position of 0 in FIGS. 11A and 11B indicates the optical axis of the imaging optical system.

As shown in FIG. 11A, on the optical axis of the imaging optical system 20 (in a vicinity of the image height Y=0 mm), the principal rays of the beams from the plurality of light emitting points (LD1 to LD32) are substantially identical to each other on the side closer to the surface to be scanned than the R2 surface of the fθ lens 20b made of plastic in the sub-scanning section after passing through the fθ lens 20a made of glass. In addition, as shown in FIG. 11B, off the axis of the imaging optical system 20 (image height Y=170 mm), the principal rays of the plurality of beams (LD1 to LD32) are substantially identical to each other on the deflection surface side opposite with respect to the R1 surface of the fθ lens 20b made of plastic in the sub-scanning section after passing through the fθ lens 20a made of glass.

Thus, it is possible to reduce the absolute value of the optical axis separation amount in the sub-scanning direction in the entire region in the main scanning direction of the plastic lens.

In this embodiment, the R1 surface is a surface of the fθ lens 20a on the deflector 10 side, the R2 surface is a surface of the fθ lens 20a on the side of the surface 30 to be scanned, the R3 surface is a surface of the fθ lens 20b on the deflector 10 side, and the R4 surface is a surface of the fθ lens 20b on the side of the surface 30 to be scanned. In addition, the following setting is performed. When each of the principal rays of the beams from the light emitting points LD1 and LD32 enters on the axis of the imaging optical system 20 (in a vicinity of the image height Y=0 mm), the principal ray passes through the fθ lens 20a at such a position that the sub-scanning separation amount becomes 43 μm on the R1 surface and 36 μm on the R2 surface. In addition, the principal ray passes through the fθ lens 20b at such a position that the sub-scanning separation amount becomes 7.4 μm on the R1 surface and 3.8 μm on the R2 surface.

Further, the following setting is performed. When each of the principal rays of the beams from the light emitting points LD1 and LD32 enters off the axis of the imaging optical system 20 (image height Y=170 mm), the principal ray passes through the fθ lens 20a at such a position that the sub-scanning separation amount becomes 31 μm on the R1 surface and 28 μm on the R2 surface. In addition, the principal ray passes through the fθ lens 20b at such a position that the sub-scanning separation amount becomes 6.1 μm on the R1 surface and 7.8 μm on the R2 surface.

Therefore, the beam separation amount conditional expression $|Z1|>2\times|Z2|$ is satisfied, where Z1 represents the sub-scanning separation amount of the principal rays of the beams from the light emitting points LD1 and LD32 on the exit surface of the fθ lens 20a (G1R2 surface), and Z2 represents the sub-scanning separation amount of the principal rays of the beams from the light emitting points LD1 and LD32 on the exit surface of the fθ lens 20b (G2R2 surface). In addition, in this embodiment, the position where the plurality of principal rays intersect each other in the sub-scanning section is on the axis (in a vicinity of image height Y=0 mm) at a distance of Ls=5.2 mm from the G2R2 surface in the optical axis direction as shown in FIG. 11A.

In addition, off the axis (image height Y=170 mm), the plurality of principal rays intersect at a distance of Ls=−20.8 mm from the G2R2 surface in the optical axis direction. The G2 lens is constituted to have a focal length of fs2=107.52 mm so as to satisfy the conditional expression $|Ls1|<0.3\times fs2$ in both the on-axis case and the off-axis case. In addition, as shown in FIGS. 11A and 11B, by setting the distance L2=226.62 mm between the intersection position of the principal rays in the sub-scanning section and the surface to be scanned, and by setting the number of light emitting points (the number of beams) N=32, the position of the sub-scanning stop (first stop 2) is optimized so that the conditional expression $L2 \geq 2\times(N-1)$ is satisfied.

Therefore, the conditional expression for controlling the pitch interval shift to be ¼ pixel or smaller is satisfied even if the surface to be scanned is shifted by ±1 mm, and hence higher definition can be achieved. If the conditional expression is not satisfied, the pitch interval error increases due to a position error on the surface to be scanned caused by the assembly error, so that it becomes difficult to achieve higher definition because of periodic unevenness generated in the image. Therefore, by satisfying this conditional expression, it is possible to keep the position at which the plurality of beams intersect each other (sub-scanning exit pupil position) away from the surface to be scanned, so as to reduce a sub-scanning pitch interval error of the plurality of beams that may occur when the distance between the surface to be scanned and the fθ lens 20b is changed.

In addition, in this embodiment, the main scanning direction power ΦG of the G1 lens is set to 0.003, and the main scanning direction power Φall of the entire fθ optical system is set to 0.0037, so as to satisfy ΦG/Φall=0.81. This is for securing focus position stability in the main scanning direction and print position stability in the main scanning direction with respect to temperature variation by satisfying the conditional expression $0.6<\Phi G/\Phi all<1$. If this conditional expression is not satisfied, the focus position shift and the print position shift in the main scanning direction are increased, so that color misregistration and image deterioration when temperature rises are increased, which is not preferred.

In addition, by forming a non-arc shaped surface on the fθ lens 20b in a vicinity of the position where the principal rays of the plurality of beams intersect each other, it is possible to reduce performance deterioration that may occur when each of the plurality of light beams is shifted in the sub-scanning direction on an optical element forming the non-arc shaped surface. In addition, by using a sub-scanning non-arc shaped surface for the fθ lens 20b having a smallest beam width in the main scanning direction, it is possible to reduce a sub-scanning curvature variation in the beam, and hence spot shape deterioration on the surface to be scanned is reduced.

The non-arc shape in the sub-scanning direction in this embodiment is constituted of only the fourth order of Z, but it is possible to use a non-arc shape of a sixth or higher order. In addition, the imaging optical system is constituted of two imaging optical elements in this embodiment, but without limiting to this structure, it is possible to constitute the imaging optical system of three or more imaging optical elements so that the same effect as in the above-mentioned embodiment can be obtained.

As described above, the fθ lens 20a made of glass is used for the imaging optical system so as to improve environment stability, and the plurality of beams intersect each other in a vicinity of the fθ lens 20b made of plastic. Thus, it is possible to provide an optical scanning apparatus and an image forming apparatus using the same, which can reduce pitch unevenness even in a fine spot optical system and can perform high-speed and high-definition image formation.

TABLE 2

| | |
|---|---|
| Working wavelength (m) | 6.80E−07 |
| Refractive index of imaging lens 20a ($\lambda$ = 680 nm) | 1.79364 |
| Refractive index of imaging lens 20b ($\lambda$ = 680 nm) | 1.52694 |
| Number of surfaces of deflector | 5 |
| Circumcircle radius of deflector (mm) | 34 |
| Rotation angle of deflector (±deg.) | 19.56 |
| Incident angle in main scanning direction (deg.) | 70 |
| Incident angle in sub-scanning direction (deg.) | 0 |
| Axial deflection point to incident surface of first imaging lens (mm) | 9.30E+01 |
| Focal length of imaging optical system (mm) | 2.70E+02 |
| Best spot diameter on surface to be scanned (main × sub μm) | 40 × 40 |

| Rotation center coordinates of deflector | |
|---|---|
| X | −11.90 |
| Y | −6.98 |

| | | R1 surface | | | R2 surface | |
|---|---|---|---|---|---|---|
| | | Scan start side (s) | Scan end side (e) | | Scan start side (s) | Scan end side (e) |
| Main scan and sub-scan | d | 2.00E+01 | | d | 4.000E+01 | |
| | R | ∞ | | R | −2.53E+02 | |
| | r | ∞ | | r | −2.53E+02 | |

| | | R3 surface | | | R4 surface | |
|---|---|---|---|---|---|---|
| | | Scan start side (s) | Scan end side (e) | | Scan start side (s) | Scan end side (e) |
| Main scanning section | d | 8.30E+00 | | d | 2.32E+02 | |
| | R | 2.93E+03 | | R | −1.11E+03 | |
| | K | −1.60E+03 | K  −1.60E+03 | K | 1.56E+01 | K  1.56E+01 |
| | $B_4$ | −8.19E−08 | $B_4$  −8.19E−08 | $B_4$ | −7.73E−08 | $B_4$  −7.73E−08 |
| | $B_6$ | 1.79E−11 | $B_6$  1.79E−11 | $B_6$ | −3.65E−12 | B6  −3.65E−12 |
| | $B_8$ | 3.44E−16 | $B_8$  3.44E−16 | $B_8$ | 2.56E−16 | $B_8$  2.56E−16 |
| | $B_{10}$ | −2.67E−21 | $B_{10}$  −2.67E−21 | $B_{10}$ | 1.51E−21 | $B_{10}$  1.51E−21 |
| Sub-scanning section | r | −8.59E+01 | | r | −3.53+01 | |
| | $D_2$ | 2.21E−04 | $D_2$  3.51E−04 | $D_2$ | 8.57E−05 | $D_2$  1.33E−04 |
| | $D_4$ | −1.88E−08 | $D_4$  3.38E−08 | $D_4$ | −1.25E−08 | $D_4$  −1.01E−08 |
| | $D_6$ | 0.00E+00 | $D_6$  0.00E+00 | $D_6$ | 1.31E−12 | $D_6$  3.73E−13 |
| | $D_8$ | 0.00E+00 | $D_8$  0.00E+00 | $D_8$ | −8.97E−17 | $D_8$  2.43E−17 |
| | $D_{10}$ | 0.00E+00 | $D_{10}$  0.00E+00 | $D_{10}$ | 2.01E−21 | $D_{10}$  −1.89E−21 |
| | $M_0$ | 0.00E+00 | | $M_0$ | 2.88E−06 | |
| | $M_1$ | 0.00E+00 | | $M_1$ | −7.87E−09 | |
| | $M_2$ | 0.00E+00 | | $M_2$ | −5.45E−10 | |
| | $M_3$ | 0.00E+00 | | $M_3$ | 1.09E−12 | |
| | $M_4$ | 0.00E+00 | | $M_4$ | 2.72E−14 | |

TABLE 2-continued

| | Incident optical system | | |
|---|---|---|---|
| | r | d | N (680 nm) |
| Light source (light emitting point) | 0 | 43.5 | 1.0000 |
| Sub-scanning stop | | 17.6290 | 1.0000 |
| Collimator lens* | ∞ | 3.5900 | 1.5793 |
| | −46.2638 | 30.0000 | 1.0000 |
| Spherical lens | ∞ | 4.0000 | 1.5131 |
| | 171.9690 | 37.5700 | 1.0000 |
| Cylindrical lens | ∞ (−38.08) | 5.0000 | 1.5131 |
| | ∞ | 44.4300 | 1.0000 |
| Main scanning stop | | 25.0000 | |
| Wedge prism | ∞ | 2.3804 | 1.5131 |
| | ∞ | 25.0500 | 1.0000 |
| Deflection surface | ∞ | 0.0000 | 1.0000 |

| Aspheric coefficient | |
|---|---|
| A | 0.00E+00 |
| B | 7.78E−07 |
| C | −4.79E−09 |
| D | 0.00E+00 |
| E | 0.00E+00 |
| F | 0.00E+00 |
| G | 0.00E+00 |

*aspheric surface

Third Embodiment

Figure 12:
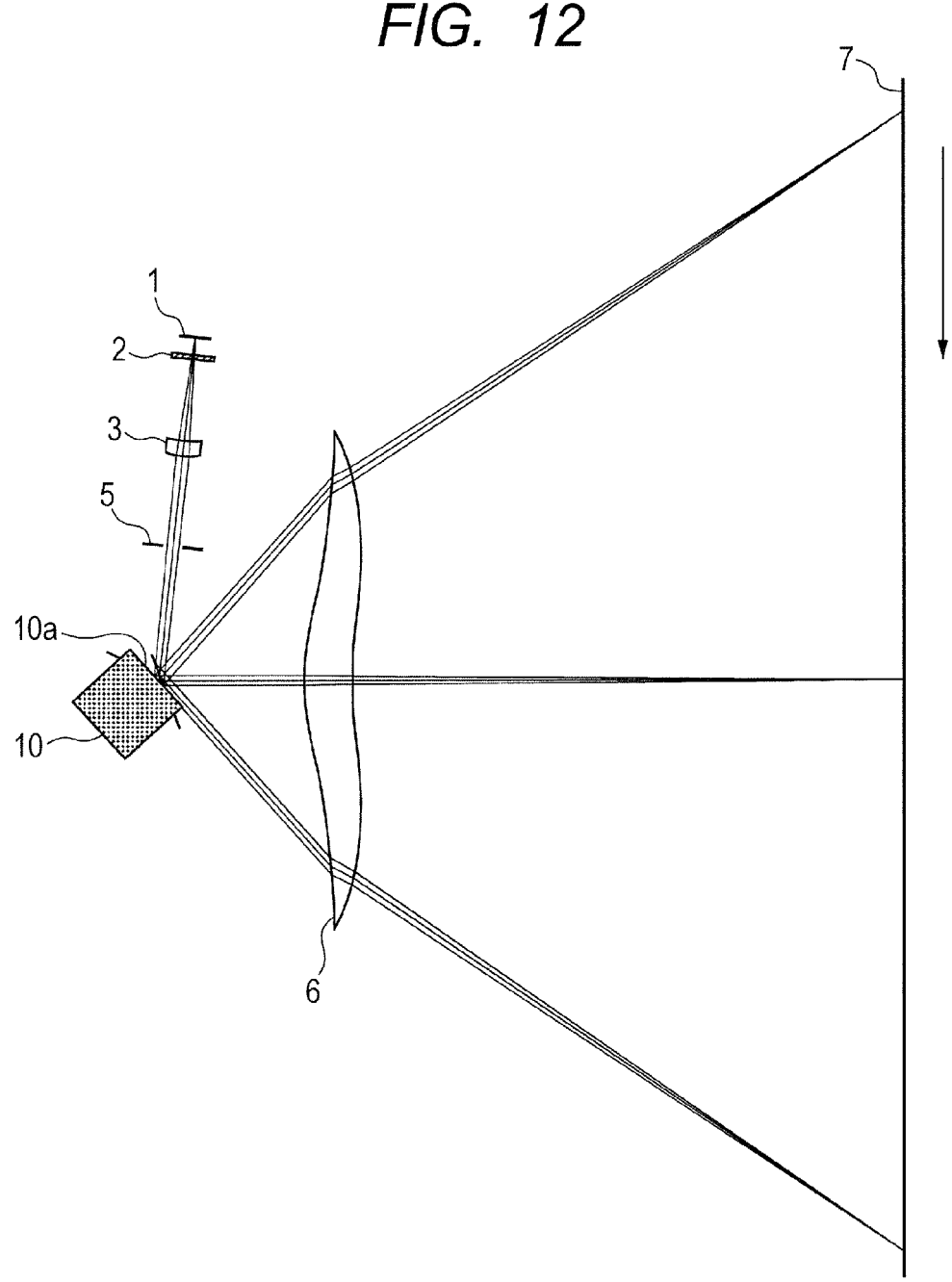
FIG. 12 is a main scanning sectional view of an optical scanning apparatus according to a third embodiment of the present invention.

This embodiment is the same as the first embodiment except for that the imaging optical system is constituted of a single fθ lens made of plastic. A main scanning section of this embodiment is illustrated in FIG. 12. In addition, Table 3 shows numeric parameters of this embodiment.

In this embodiment, a shape of the fθ lens 6 in the main scanning section can be expressed by the following functions, where an intersection point with the optical axis is regarded as an origin. Here, the optical axis is regarded as the X axis, and in a main scanning plane, the shape is expressed by a function similar to that of the first embodiment. Specifically, the Y axis represents a direction perpendicular to the optical axis, and the Z axis represents a direction perpendicular to the optical axis in the sub-scanning plane.

Scan Start Side $$x = \frac{\frac{y^2}{R}}{1+\sqrt{1-(1+K)(y/R)^2}} + B_{4s}y^4 + B_{6s}y^6 + B_{8s}y^8 + B_{10s}y^{10} \quad (a)$$

Scan End Side $$x = \frac{\frac{y^2}{R}}{1+\sqrt{1-(1+K)(y/R)^2}} + B_{4e}y^4 + B_{6e}y^6 + B_{8e}y^8 + B_{10e}y^{10} \quad (b)$$

In the functions, R represents a curvature radius, K, $B_4$, $B_6$, $B_8$ and $B_{10}$ are aspheric coefficients, in which a suffix s means the scan start side while a suffix e means the scan end side. In this embodiment, the shape of the fθ lens 6 in the main scanning section on the exit surface side is adapted to be asymmetric with respect to the optical axis. In other words, when the fθ lens 6 is divided into the scan start side and the scan end side with respect to the optical axis, the aspheric coefficients on both sides are set different from each other.

A shape of the fθ lens 6 in the sub-scanning section is different from that in the first embodiment, and the following function is used. The curvature radius in the sub-scanning section is changed continuously in an effective lens portion, and a sign of the curvature radius is reversed.

The shape of the fθ lens 6 in the sub-scanning section can be expressed by the following continuous functions, where on the scan start side and the scan end side, the X axis represents the optical axis, the Y axis represents the direction perpendicular to the optical axis in the main scanning plane, and the Z axis represents the direction perpendicular to the optical axis in the sub-scanning plane.

$$S = \frac{\frac{z^2}{r'}}{1+\sqrt{1-(z/r')^2}}$$

$$\frac{1}{r'} = \frac{1}{r}(1 + D_{2s}y^2 + D_{4s}y^4 + D_{6s}y^6 + D_{8s}y^8 + D_{10s}y^{10} \ldots)$$

$$S = \frac{\frac{z^2}{r'}}{1+\sqrt{1-(z/r')^2}}$$

$$\frac{1}{r'} = \frac{1}{r}(1 + D_{2e}y^2 + D_{4e}y^4 + D_{6e}y^6 + D_{8e}y^8 + D_{10e}y^{10} \ldots)$$

In the functions, r' represents a curvature radius in the sub-scanning direction, and $D_j$ represents a curvature variation coefficient.

If the coefficient is different between a positive side and a negative side of Y, the suffix s indicates the scan start side while the suffix e indicates the scan end side. In addition, the curvature radius in the sub-scanning section indicates a curvature radius in a section perpendicular to a shape line (meridional line) in the main scanning section. In addition, a shape of the exit surface of the collimator lens 3 of the incident optical system is set to be an anamorphic shape, the beam is weakly converging light in the main scanning section, and the focus line is imaged in a vicinity of the deflection surface 10a in the sub-scanning section. Further, the incident surface has a diffraction surface expressed by the following function of optical path difference.

$$\Phi(r) = \frac{2\pi}{m\lambda}(C_1 r^2 + C_2 r^4 + C_3 r^6 + C_4 r^8)$$

In the function, m represents a diffraction order ("1" in this embodiment), and r is expressed by the following equation.

$$r = \sqrt{y^2 + z^2}$$

Note that, $C_1$ to $C_4$ represent phase coefficients. The incident surface of this embodiment is a blazed diffraction surface, which is constituted of a surface having an effect of reducing an oscillation wavelength variation of the light source due to an environment variation (temperature variation) and a focus line position shift due to mainly a refractive index variation of the plastic lens.

TABLE 3

| | |
|---|---|
| Working wavelength (m) | 7.90E−07 |
| Refractive index of imaging optical system | 1.5240 |
| Number of surfaces of deflector | 4 |
| Circumcircle radius of deflector (mm) | 20 |
| Rotation angle of deflector (±deg.) | 24.3 |
| Incident angle in main scanning direction (deg.) | 85 |
| Incident angle in sub-scanning direction (deg.) | 0 |
| Axial deflection point to incident surface of fθ lens (mm) | 2.66E+01 |
| Fθ coefficient (mm) | 1.26E+02 |

| Rotation center coordinates of deflector | |
|---|---|
| X | −5.639 |
| Y | −4.313 |

| | | R1 surface | | R2 surface | |
|---|---|---|---|---|---|
| | | Scan start side (s) | Scan end side (e) | Scan start side (s) | Scan end side (e) |
| Main scanning section | d | 9.00E+00 | | d | 1.035E+02 |
| | R | 4.30E+01 | | R | 6.73E+01 |
| | K | −1.69E−01 | K −1.69E−01 | K 7.84E−01 | K 7.84E−01 |
| | $B_4$ | −1.57E−05 | $B_4$ −1.57E−05 | $B_4$ −1.12E−05 | $B_4$ −1.12E−05 |
| | $B_6$ | 1.18E−08 | $B_6$ 1.15E−08 | $B_6$ 5.48E−09 | $B_6$ 5.48E−09 |
| | $B_8$ | −6.01E−12 | $B_8$ −5.50E−12 | $B_8$ −1.55E−12 | $B_8$ −1.55E−12 |
| | $B_{10}$ | 1.29E−15 | $B_{10}$ 9.35E−16 | $B_{10}$ 2.91E−17 | $B_{10}$ 2.91E−17 |
| | $B_{12}$ | −1.14E−21 | $B_{12}$ 5.93E−20 | $B_{12}$ 3.71E−20 | $B_{12}$ 3.71E−20 |
| | $B_{14}$ | −2.62E−23 | $B_{14}$ 1.76E−23 | $B_{14}$ −5.17E−24 | $B_{14}$ −5.17E−24 |
| | $B_{16}$ | −1.08E−26 | $B_{16}$ −2.69E−26 | $B_{16}$ 2.02E−29 | $B_{16}$ 2.02E−29 |
| Sub-scanning section | r | −1.04E+01 | | r | −7.79E+00 |
| | $D_2$ | 2.44E−04 | $D_2$ 2.36E−04 | $D_2$ 1.50E−04 | $D_2$ 1.53E−04 |
| | $D_4$ | −2.60E−07 | $D_4$ −2.43E−07 | $D_4$ −2.43E−07 | $D_4$ −2.77E−07 |
| | $D_6$ | 6.94E−11 | $D_6$ 5.16E−11 | $D_6$ 4.10E−10 | $D_6$ 5.50E−10 |
| | $D_8$ | 7.75E−14 | $D_8$ 8.18E−14 | $D_8$ −5.31E−13 | $D_8$ −8.49E−13 |
| | $D_{10}$ | −5.45E−17 | $D_{10}$ −3.95E−17 | $D_{10}$ 4.22E−16 | $D_{10}$ 8.45E−16 |
| | $D_{12}$ | 1.01E−20 | $D_{12}$ −8.51E−21 | $D_{12}$ −1.90E−19 | $D_{12}$ −5.10E−19 |
| | $D_{14}$ | −2.89E−25 | $D_{14}$ 6.28E−24 | $D_{14}$ 4.67E−23 | $D_{14}$ 1.73E−22 |
| | $D_{16}$ | 0.00E+00 | $D_{16}$ 0.00E+00 | $D_{16}$ −5.24E−27 | $D_{16}$ −2.52E−26 |

| Incident optical system | | | |
|---|---|---|---|
| | r | d | N (790 nm) |
| Light source (light emitting point) | 0.0000 | 3.9300 | 0.0000 |
| Sub-scanning stop | | 16.8000 | |
| Collimator lens* | 0.0000 | 3.0000 | 1.5240 |
| Main scanning/sub scanning | −19.6587/−11.3786 | 16.9160 | 0.0000 |
| Main scanning stop | | 25.6800 | |

TABLE 3-continued

| | | | |
|---|---|---|---|
| Deflection surface | 0.0000 | 0.0000 | 1.0000 |

| Aspheric coefficient | |
|---|---|
| $C_1$ | 0.00E+00 |
| $C_2$ | 0.00E+00 |
| $C_3$ | 1.34E−02 |
| $C_4$ | 0.00E+00 |
| $C_5$ | 1.26E−02 |

*anamorphic diffraction element

Figure 13A:
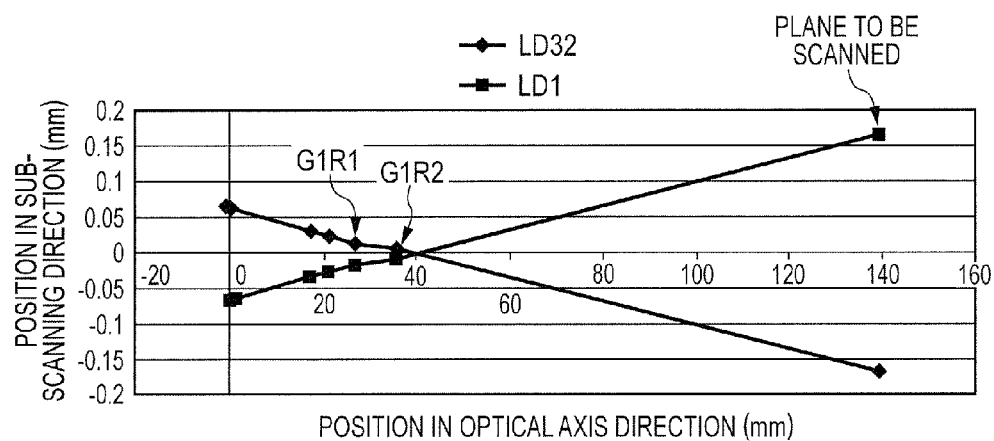
FIG. 13A is a graph showing the principal rays entering the central region in the third embodiment.
Figure 13B:
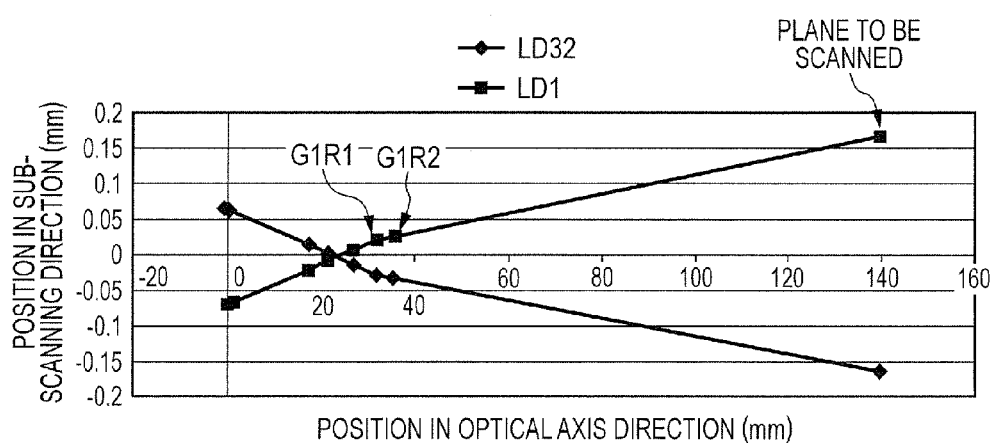
FIG. 13B is a graph showing the principal rays entering the end region in the third embodiment.

FIG. 13A shows principal ray passing positions in the sub-scanning section of the beams from the light emitting points LD1 and LD32 on the axis of the fθ lens 6 (in a vicinity of the zero image height). In addition, FIG. 13B shows principal ray passing positions in the sub-scanning section of the beams from the light emitting points LD1 and LD32 off the axis of the fθ lens 6 (at an image height Y=110 mm). Here, in each of FIGS. 13A and 13B, the horizontal axis represents a position in the optical axis direction, and the vertical axis represents a position in the sub-scanning direction. The positions of the light emitting points LD1 and LD32 in the sub-scanning direction in FIGS. 13A and 13B correspond to the positions of the light emitting points LD1 and LD32 in the sub-scanning direction in FIG. 2C. Note that, the sub-scanning position of 0 in FIGS. 13A and 13B indicates the optical axis of the fθ lens 6.

In this embodiment, the R1 surface is a surface of the fθ lens 6 on the deflector 10 side (G1R1 surface), and the R2 surface is a surface of the fθ lens 6 on the side of the surface 30 to be scanned (G1R2 surface). In addition, the following setting is performed. When each of the principal rays of the beams from the light emitting points LD1 and LD32 enters on the axis of the fθ lens 6 (in a vicinity of the image height Y=0 mm), the principal ray passes through the fθ lens 6 at such a position that the sub-scanning separation amount becomes 29 μm in a Z direction on the R1 surface and 15 μm on the R2 surface, and hence the principal rays intersect each other at a position closer to the surface to be scanned than the fθ lens.

Further, the following setting is performed. When each of the principal rays of the beams from the light emitting points LD1 and LD32 enters off the axis of the fθ lens 6 (image height Y=170 mm), the principal ray passes through the fθ lens 6 at such a position that the sub-scanning separation amount becomes 48 μm on the R1 surface and 58 μm on the R2 surface, and hence the principal rays intersect each other at a position before the fθ lens.

In addition, in this embodiment, the position where the principal rays intersect each other in the sub-scanning section is on the axis (in a vicinity of image height Y=0 mm) at a distance of 4.5 mm (Ls) from the R2 surface of the fθ lens 6 as shown in FIG. 13A.

In addition, off the axis (image height Y=107 mm), the principal rays intersect each other at a distance of Ls=−9.2 mm from the G1R1 surface in the optical axis direction. The fθ lens 6 is constituted to have a focal length of fs=27.1 mm so as to satisfy the conditional expression |Ls|<0.3×fs on the axis. In addition, as shown in FIGS. 13A and 13B, by setting the distance L2=116.5 mm between the intersection position of the principal rays in the sub-scanning section and the surface to be scanned, and by setting the number of light emitting points (the number of beams) N=32, the position of the sub-scanning stop (first stop 2) is optimized so that the conditional expression L2≥2×(N−1) is satisfied.

Therefore, even if the surface to be scanned is shifted by ±1 mm, the conditional expression for controlling the pitch interval shift to be ¼ pixel or smaller is satisfied, so that higher definition can be achieved. If the conditional expression is not satisfied, the pitch interval error increases due to a position error on the surface to be scanned caused by the assembly error, and hence it becomes difficult to achieve higher definition because of periodic unevenness generated in the image. Therefore, by satisfying this conditional expression, it is possible to keep the position at which the plurality of beams intersect each other (sub-scanning exit pupil position) away from the surface to be scanned, so as to reduce a sub-scanning pitch interval error of the plurality of beams that may occur when the distance between the surface to be scanned and the fθ lens 6 is changed.

Variation Example 1

In the embodiment described above, the imaging optical system is constituted of two lenses, and one of the lenses is a glass lens while the other is a plastic lens. However, it is possible to replace the glass lens by a plastic lens so that the imaging optical system is constituted of two plastic lenses. In this case, as to the plastic lens that is farther from the deflector (polygon mirror), the intersection of the principal rays in the sub-scanning direction only needs to be performed as described in the first embodiment.

Variation Example 2

In the embodiment described above, in the sub-scanning section, the principal rays of the beams from the plurality of light emitting points intersect each other at a position behind the plastic lens in the optical axis direction when entering the central region of the plastic lens, while the principal rays intersect each other at a position in front of the plastic lens in the optical axis direction when entering the end region of the plastic lens. However, in accordance with a design condition of the imaging optical system, the intersection position of the principal rays of the beams entering the central region and the end region of the plastic lens may be reversed, that is, before the plastic lens in the case of the central region and behind the plastic lens in the case of the end region.

In addition, it is possible to adopt the following structure. When entering the central region of the plastic lens in the main scanning direction, the intersection position of the principal rays is set to a position of the plastic lens, and the intersection position of the principal rays is shifted from the position of the plastic lens in the opposite directions between the case of entering a region slightly apart from the central region to the end region and the case of entering a region largely apart from the central region to the end region.

Variation Example 3

The 32 light emitting points of the light source 1 in the embodiment described above are arranged in the one-dimensional manner (linearly) at least in the sub-scanning direction with a tilt to the main scanning section. However, it is possible to arrange the light emitting points linearly in the sub-scanning direction so as to be perpendicular to the main scanning section. In addition, the number of the light emitting points is not limited to but is determined appropriately according to the embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-255117, filed Nov. 22, 2011, which is hereby incorporated by reference herein in its entirety.

What is claimed is:

1. An optical scanning apparatus, comprising:
a light source including a plurality of light emitting points;
a deflector configured to deflect beams from the plurality of light emitting points in a main scanning direction;
an incident optical system configured to cause the beams from the plurality of light emitting points to enter the deflector; and
an imaging optical system configured to condense the beams deflected by the deflector onto a surface to be scanned, wherein:
the plurality of light emitting points are arranged in a sub-scanning direction parallel to a rotation axis of the deflector;
the imaging optical system comprises a plastic lens;
in a sub-scanning section that is perpendicular to the main scanning direction, and that includes the sub-scanning direction, principal rays of the beams from the plurality of light emitting points entering one of a central region or an end region in the main scanning direction of the plastic lens intersect each other on an incident surface of the plastic lens or, at a position between the deflector and the plastic lens, on an optical axis of the imaging optical system; and
the principal rays entering another of the central region or the end region of the plastic lens intersect each other on an exit surface of the plastic lens or, at a position between the surface to be scanned and the plastic lens, on the optical axis.

2. An optical scanning apparatus according to claim 1, wherein the following conditional expression is satisfied:

$$|Ls| < 0.3 \times fs2,$$

where Ls represents a distance in the direction of the optical axis between the position of intersection when the principal rays from the plurality of light emitting points enter the central region of the plastic lens and a position of the plastic lens, and fs2 represents a focal length of the plastic lens.

3. An optical scanning apparatus according to claim 2, wherein the plastic lens has power in the sub-scanning section.

4. An optical scanning apparatus according to claim 1, wherein the imaging optical system comprises another lens made of glass or plastic.

5. An optical scanning apparatus according to claim 4, wherein the plastic lens is disposed farther from the deflector than the another lens.

6. An optical scanning apparatus according to claim 1, wherein an incident surface and an exit surface of the plastic lens comprises a non-arc shaped surface in the sub-scanning section.

7. An optical scanning apparatus according to claim 6, wherein the non-arc shaped surface comprises a non-arc shape having a fourth order term in the sub-scanning section.

8. An optical scanning apparatus according to claim 1, wherein a curvature in the sub-scanning section of an incident surface and an exit surface of the plastic lens is varied in the main scanning section.

9. An optical scanning apparatus according to claim 4, wherein the following conditional expression is satisfied:

$$0.6 < \Phi G / \Phi all < 1,$$

where $\Phi G$ represents power of the one glass lens in the main scanning section perpendicular to the sub-scanning section, and $\Phi all$ represents power of the entire imaging optical system in the main scanning section.

10. An optical scanning apparatus according to claim 1, wherein the light source comprises a surface emitting laser.

11. An optical scanning apparatus according to claim 1, wherein the principal rays from the plurality of light emitting points entering the central region in the main scanning direction of the plastic lens intersect each other on the exit surface or at the position between the surface to be scanned and the plastic lens, and the principal rays from the plurality of light emitting points entering the end region in the main scanning direction of the plastic lens intersect each other on the incident surface or at the position between the deflector and the plastic lens.

12. An optical scanning apparatus according to claim 1, wherein both of the positions are disposed between the deflector and the surface to be scanned.

13. An image forming apparatus, comprising:
an optical scanning apparatus comprising:
a light source including a plurality of light emitting points;
a deflector configured to deflect beams from the plurality of light emitting points in a main scanning direction;
an incident optical system configured to cause the beams from the plurality of light emitting points to enter the deflector; and
an imaging optical system configured to condense the beams deflected by the deflector onto a surface to be scanned;
a photosensitive member in which the surface to be scanned is disposed;
a developing unit configured to develop an electrostatic latent image, which is formed on the photosensitive member by the beams scanning by the optical scanning apparatus, as a toner image;
a transferring unit configured to transfer the developed toner image onto a transfer material; and
a fixing unit configured to fix the transferred toner image onto the transfer material, wherein:
the plurality of light emitting points are arranged in a sub-scanning direction parallel to a rotation axis of the deflector;
the imaging optical system comprises a plastic lens;
in a sub-scanning section that is perpendicular to the main scanning direction, and that includes the sub-scanning direction, principal rays of the beams from the plurality of light emitting points entering one of a central region or an end region in the main scanning direction of the plastic lens intersect each other on an incident surface of the plastic lens or, at a position between the deflector and the plastic lens, on an optical axis of the imaging optical system; and the principal rays entering another of the central region or the end region of the plastic lens intersect each other on an exit surface of the plastic lens or, at a position between the surface to be scanned and the plastic lens, on the optical axis.

14. An image forming apparatus according to claim 13, further comprising a printer controller configured to convert code data input from an external device into an image signal, so that the optical scanning apparatus receives the image signal.

15. An image forming apparatus according to claim 13, wherein the imaging optical system comprises another lens made of glass or plastic.

16. An image forming apparatus according to claim 15, wherein the plastic lens is disposed farther from the deflector than the another lens.

* * * * *